United States Patent
Boy et al.

(10) Patent No.: US 8,793,026 B2
(45) Date of Patent: Jul. 29, 2014

(54) ELECTRICAL LOAD MANAGEMENT SYSTEM

(75) Inventors: Ralph W. Boy, Everett, WA (US); Neal Harold, Renton, WA (US); Jay B. Biederman, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/968,390

(22) Filed: Dec. 15, 2010

(65) Prior Publication Data

US 2012/0065790 A1    Mar. 15, 2012

Related U.S. Application Data

(63) Continuation-in-part of application No. 12/883,016, filed on Sep. 15, 2010, now abandoned.

(51) Int. Cl.
*G05D 11/00* (2006.01)
(52) U.S. Cl.
USPC ............... 700/286; 700/28; 700/32; 244/53 R
(58) Field of Classification Search
USPC ............... 700/28, 286, 291, 295; 307/9.1, 39; 244/53 R
See application file for complete search history.

(56) References Cited

U.S. PATENT DOCUMENTS

| | | | |
|---|---|---|---|
| 3,842,249 A | 10/1974 | Geyer et al. | |
| 5,583,419 A | 12/1996 | Haller | |
| 7,207,521 B2 | 4/2007 | Atkey | |
| 7,210,653 B2 | 5/2007 | Atkey | |
| 8,237,308 B2 | 8/2012 | Atkey et al. | |
| 2002/0128759 A1 | 9/2002 | Sodoski et al. | |
| 2002/0165696 A1* | 11/2002 | Bond et al. | 702/183 |
| 2004/0095237 A1* | 5/2004 | Chen et al. | 340/506 |
| 2005/0006954 A1 | 1/2005 | Bowman et al. | |
| 2005/0229838 A1* | 10/2005 | Lyons | 117/11 |
| 2009/0152942 A1* | 6/2009 | Waite et al. | 307/9.1 |
| 2010/0036540 A1* | 2/2010 | Vian et al. | 700/297 |
| 2010/0138363 A1* | 6/2010 | Batterberry et al. | 705/412 |

* cited by examiner

*Primary Examiner* — Mohammad Ali
*Assistant Examiner* — Nathan Laughlin
(74) *Attorney, Agent, or Firm* — Yee & Associates, P.C.

(57) ABSTRACT

An electrical load life-cycle management and analysis system and method are presented. In the system and method, a database module stores electrical system configuration data and electrical system requirements, and an electrical system analysis module determines electrical system performance characteristics as a function of and based on the electrical system configuration data. In addition, an electrical system configuration management module manages at least one change to the electrical system configuration data, and compares the electrical system performance characteristics to the electrical system requirements to enable optimal performance and to provide compliance information.

21 Claims, 18 Drawing Sheets

Electrical Load Margin and Capacity of Project: ABC ZA001 — If Load-Cap > 45% = 'Warning'; If Load-Cap >= 50% = 'Non-Optimal'

| TYPE | BUS | BUS NAME | NORMAL LOAD DATA (Amps) | | | | | | C/B | C/B Cap. Amps | Amps | Margin Amps | % of Capacity | Load Level |
|---|---|---|---|---|---|---|---|---|---|---|---|---|---|---|
| | | | Pax-Load | Eng-Start | Taxi | T/O-Climb | Cruise | Hold-Land | | | | | | |
| DC | APU HBB 28V | APU HBB 28VDC | 6.020 | 0.000 | 0.000 | 0.000 | 0.000 | 0.000 | CK2432507 | 75 | 6.020 | 68.980 | 8.03% | Safe |
| AC | BB RLY-A | BB RLY | 3.602 | 4.029 | 4.659 | 5.161 | 4.554 | 4.474 | CK2432507 | 15 | 5.161 | 9.839 | 34.41% | Safe |
| AC | BB RLY-B | BB RLY | 3.602 | 3.570 | 3.831 | 3.586 | 3.726 | 3.831 | CK2432507 | 15 | 3.831 | 11.169 | 25.54% | Safe |
| AC | BB RLY-C | BB RLY | 3.602 | 4.029 | 4.659 | 5.161 | 4.554 | 4.474 | CK2432507 | 15 | 5.161 | 9.839 | 34.41% | Safe |
| AC | BKUP BUS-A | BKUP BUS | 3.602 | 4.029 | 4.659 | 5.161 | 4.554 | 4.474 | CK2432507 | 15 | 5.161 | 9.839 | 34.41% | Safe |
| AC | BKUP BUS-B | BKUP BUS | 3.602 | 3.570 | 3.831 | 3.586 | 3.726 | 3.831 | CK2432507 | 15 | 3.831 | 11.169 | 25.54% | Safe |
| AC | BKUP BUS-C | BKUP BUS | 3.602 | 4.029 | 4.659 | 5.161 | 4.554 | 4.474 | CK2432507 | 15 | 5.161 | 9.839 | 34.41% | Safe |
| TRU | C1 TRU | C1 TRU | 114.071 | 97.429 | 95.714 | 93.893 | 93.893 | 95.964 | M2432103 | 240 | 114.071 | 125.929 | 47.53% | Warning |
| TRU | C1 TRU | C1 TRU | 114.071 | 97.429 | 95.714 | 93.893 | 93.893 | 95.964 | M2432103 | 240 | 114.071 | 125.929 | 47.53% | Warning |
| TRU | C1 TRU | C1 TRU | 114.071 | 97.429 | 95.714 | 93.893 | 93.893 | 95.964 | M2432103 | 240 | 114.071 | 125.929 | 47.53% | Warning |
| TRU | C2 TRU | C2 TRU | 87.821 | 87.036 | 93.393 | 87.429 | 90.821 | 93.393 | M2432104 | 240 | 93.393 | 146.607 | 38.91% | Safe |
| TRU | C2 TRU | C2 TRU | 87.821 | 87.036 | 93.393 | 87.429 | 90.821 | 93.393 | M2432104 | 240 | 93.393 | 146.607 | 38.91% | Safe |
| TRU | C2 TRU | C2 TRU | 87.821 | 87.036 | 93.393 | 87.429 | 90.821 | 93.393 | M2432104 | 240 | 93.393 | 146.607 | 38.91% | Safe |
| DC | CAPT 28VDC | CAPT 28VDC | 114.062 | 97.441 | 95.703 | 93.896 | 93.891 | 95.953 | CK2432804 | 150 | 114.062 | 35.938 | 76.04% | Non-Opt |
| DC | F/O 28VDC | F/O 28VDC | 87.816 | 87.045 | 93.405 | 87.444 | 90.804 | 93.405 | CK2432804 | 150 | 93.405 | 56.595 | 62.27% | Non-Opt |
| AC | GEN L1-A | GEN L1 | 0.000 | 102.866 | 117.778 | 123.054 | 111.153 | 99.919 | M2421001 | 354.61 | 123.054 | 231.556 | 34.70% | Safe |
| AC | GEN L1-B | GEN L1 | 0.000 | 110.747 | 125.721 | 129.408 | 117.691 | 106.636 | M2421001 | 354.61 | 129.408 | 225.202 | 36.49% | Safe |
| AC | GEN L1-C | GEN L1 | 0.000 | 111.283 | 126.034 | 129.218 | 118.110 | 106.169 | M2421001 | 354.61 | 129.218 | 225.392 | 36.44% | Safe |
| AC | GEN L2-A | GEN L2 | 0.000 | 64.219 | 287.172 | 210.838 | 225.353 | 280.496 | M2421002 | 354.61 | 287.172 | 67.438 | 80.98% | Non-Opt |

FIG. 21

ELECTRICAL LOAD MANAGEMENT SYSTEM

CROSS-REFERENCE TO RELATED APPLICATION

This application claims priority under U.S.C. 120 to and is a Continuation-In-Part application of U.S. patent application Ser. No. 12/883,016, filed 15 Sep. 2010 now abandoned, content of which is incorporated herein by reference in its entirety.

FIELD

Embodiments of the present disclosure relate generally to electrical load management. More particularly, embodiments of the present disclosure relate to life-cycle electrical load management.

BACKGROUND

Large scale electrical systems such as an electrical system in an aircraft, ship, building, factory, town and city may change significantly over a life of the electrical system. Components may be added, deleted, and changed over the life of the electrical system. Such changes to the electrical system may increase or decrease a load on various parts of the electrical system, may require changes in electrical system architecture, and may necessitate changes in other components of the electrical system.

SUMMARY

An electrical load life-cycle management and analysis system and method are disclosed. In the system and method, a database module stores electrical system configuration data and electrical system requirements, and an electrical system analysis module determines electrical system performance characteristics as a function of and based on the electrical system configuration data. In addition, an electrical system configuration management module manages at least one change to the electrical system configuration data, and compares the electrical system performance characteristics to the electrical system requirements to enable optimal performance and to provide compliance information.

In this manner, embodiments of the disclosure provide a system and method to allow users/operators to easily and efficiently manage and analyze an electrical loading on a power distribution system from design to retirement of an electrical system such as an airframe, and minimizing cost of electrical load analysis while meeting total system safety constraints. For example, the operators can use communication interfaces to manage electrical loading during the design, manufacturing, delivery, and post delivery to ensure adequate electrical load is provided for certain operation thereby preventing non-optimal operation, and the like.

In an embodiment, an electrical load life-cycle management and analysis system comprises a database module operable to store electrical system configuration data and electrical system requirements. The system further comprises an electrical system analysis module operable to determine electrical system performance characteristics as a function of the electrical system configuration data. The system further comprises an electrical system configuration management module which manages at least one change to the electrical system configuration data, and compares the electrical system performance characteristics to the electrical system requirements to enable optimal performance.

In another embodiment, a method for electrical load life-cycle management and analysis comprises stores electrical system configuration data and electrical system requirements in a database. The method further determines electrical system performance characteristics as a function of and based on the electrical system configuration data, and compares the electrical system performance characteristics to the electrical system requirements to provide compliance information.

In yet another embodiment, a method for operating an electrical load life-cycle management and analysis system stores electrical system configuration data and electrical system requirements in a database. The method further provides a communication interface to an operator of an electrical system corresponding to the electrical system configuration data, and receives a configuration change to the electrical system from the operator via the communication interface. The method then updates the electrical system configuration data for the configuration change, and simulates electrical system performance characteristics as a function of and based on the electrical system configuration data. The method further compares the electrical system performance characteristics to the electrical system requirements to provide compliance information, and provides compliance information to the operator of the electrical system via the communication interface.

In yet another embodiment, a computer readable storage medium comprises computer-executable instructions for electrical load life-cycle management and analysis. The computer-executable instructions stores electrical system configuration data and electrical system requirements in a database. The computer-executable instructions further determines electrical system performance characteristics as a function of and based on the electrical system configuration data, and compares the electrical system performance characteristics to the electrical system requirements to provide compliance information.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

FIG. 15 is an illustration of an exemplary load data input interface page provides power requirements for a given CB and enables "What If" requirements to be given according to an embodiment of the disclosure. The interface page.

FIG. 19 is an illustration of an exemplary report page according to an embodiment of the disclosure.

FIG. 21 is an illustration of an exemplary diagnostic report according to an embodiment of the disclosure.

DETAILED DESCRIPTION

Figure 1:
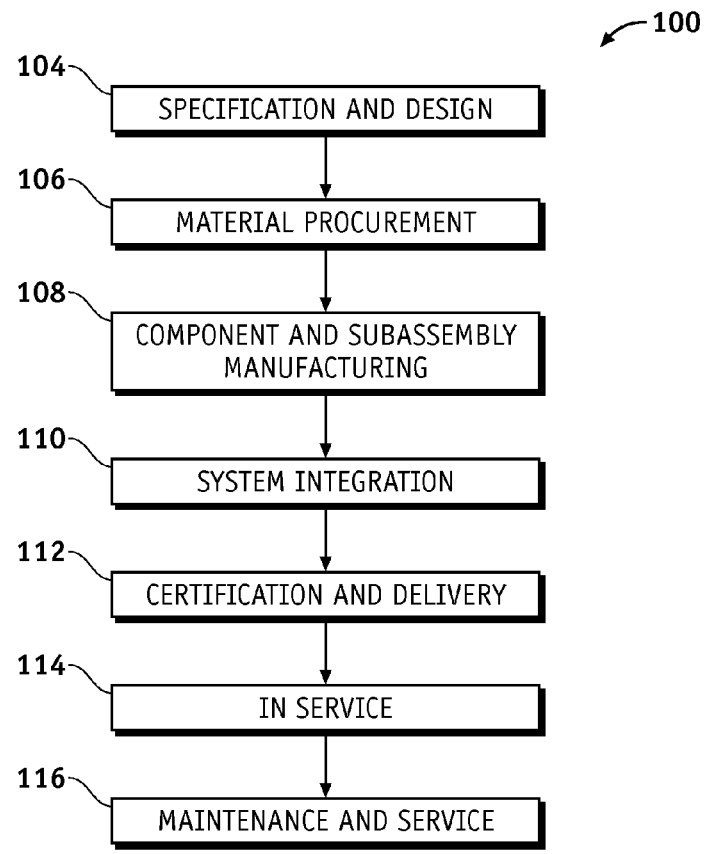
FIG. 1 is an illustration of a flow diagram of an exemplary aircraft production and service methodology.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to, power distribution systems, electrical systems, aircraft control systems, aircraft electrical systems, and other functional aspects of the systems (and the individual operating components of the systems) may not be described in detail herein. In addition, those skilled in the art will appreciate that embodiments of the present disclosure may be practiced in conjunction with a variety of circuits, and that the embodiments described herein are merely example embodiments of the disclosure.

Embodiments of the disclosure are described herein in the context of a practical non-limiting application, namely, managing an aircraft electrical system. Embodiments of the disclosure, however, are not limited to such aircraft electrical systems, and the techniques described herein may also be utilized in other applications. For example but without limitation, embodiments may be applicable to automotive vehicles, ships, buildings, hospitals, factories, spacecraft, submarines, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Ever increasing use of electricity to control aircraft and other complex vehicles and electrical systems, in place of prior use of mechanical and pneumatic equipment, and hydraulics requires enhanced diligence to accurately manage power distribution system loading. This requirement is especially pronounced in electrical systems that are supplied with standalone power sources, such as but without limitation, aircraft, automobiles, other mobile vehicles, and the like. Embodiments of the disclosure comprise a system and method to manage and analyze an electrical loading on a power distribution system from design to retirement of an electrical system such as an airframe. The system manages electrical loading during the design, manufacturing and delivery phases of manufacture of the electrical system. The system and method also manages electrical load changes after delivery of the electrical system (e.g., an airframe). In this manner, the system and method facilitate ownership transfer for electrical loading related elements.

Further, the system and method comprise a comprehensive electrical load management system that follows the electrical system lifecycle from design to retirement. Data, algorithms and methodologies that are used for load analysis during manufacturing and certification seamlessly follow the electrical system after delivery.

The embodiments also provide an electrical load analysis tool (eLAT). The eLAT comprises various interface pages allowing manufacturers as well as a new owner of the electrical system easily and efficiently manage the electrical load on the electrical system and, for example but without limitation, determine "what if" sceneries, add/delete electrical components to ensure adequate load is provided for certain operation thereby preventing non-optimal operation, and the like. Additionally, regulatory agencies, such as but without limitations, Federal Aviation Administration (FAA), automotive regulatory agencies, building and factory regulatory agencies, and the like, can easily and efficiently obtain and use results of the eLAT analysis for purpose of certification, compliance monitoring, and the like.

Figure 2:
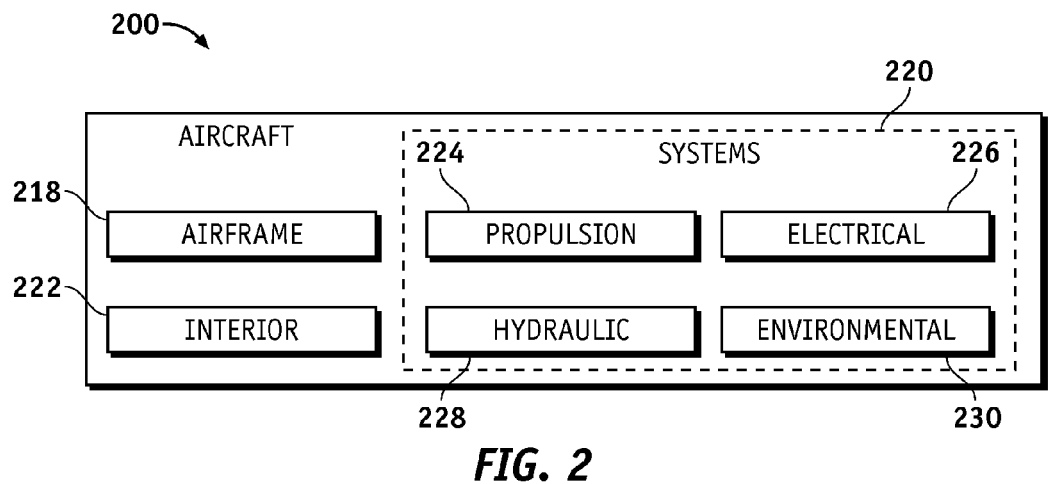
FIG. 2 is an illustration of an exemplary block diagram of an aircraft.

Referring more particularly to the drawings, embodiments of the disclosure may be described in the context of an aircraft manufacturing and maintenance method 100 (method 100) as shown in FIG. 1 and an aircraft 200 as shown in FIG. 2. During pre-production, the exemplary method 100 may include specification and design 104 of the aircraft 200 and material procurement 106. During production, component and subassembly manufacturing 108 and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also include modification, reconfiguration, refurbishment, and so on).

Each of the processes of the method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be without limitation an airline, leasing company, military entity, service organization, and the like.

As shown in FIG. 2, the aircraft 200 produced by the exemplary method 100 may include an airframe 218 with a plurality of systems 220 and an interior 222. Examples of high-level systems 220 include one or more of a propulsion system 224, an electrical system 226, a hydraulic system 228, and an environmental system 230. Any number of other systems may also be included. Although an aerospace example is shown, the embodiments of the disclosure may be applied to other industries, such as the automotive industry.

Apparatus and methods embodied herein may be employed during any one or more of the stages of the method 100. For example, components or subassemblies corresponding to production process 108 may be fabricated or manufactured in a manner similar to components or subassemblies produced while the aircraft 200 is in service. Also, one or more apparatus embodiments, method embodiments, or a combination thereof may be utilized during the production stages 108 and 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Figure 3:
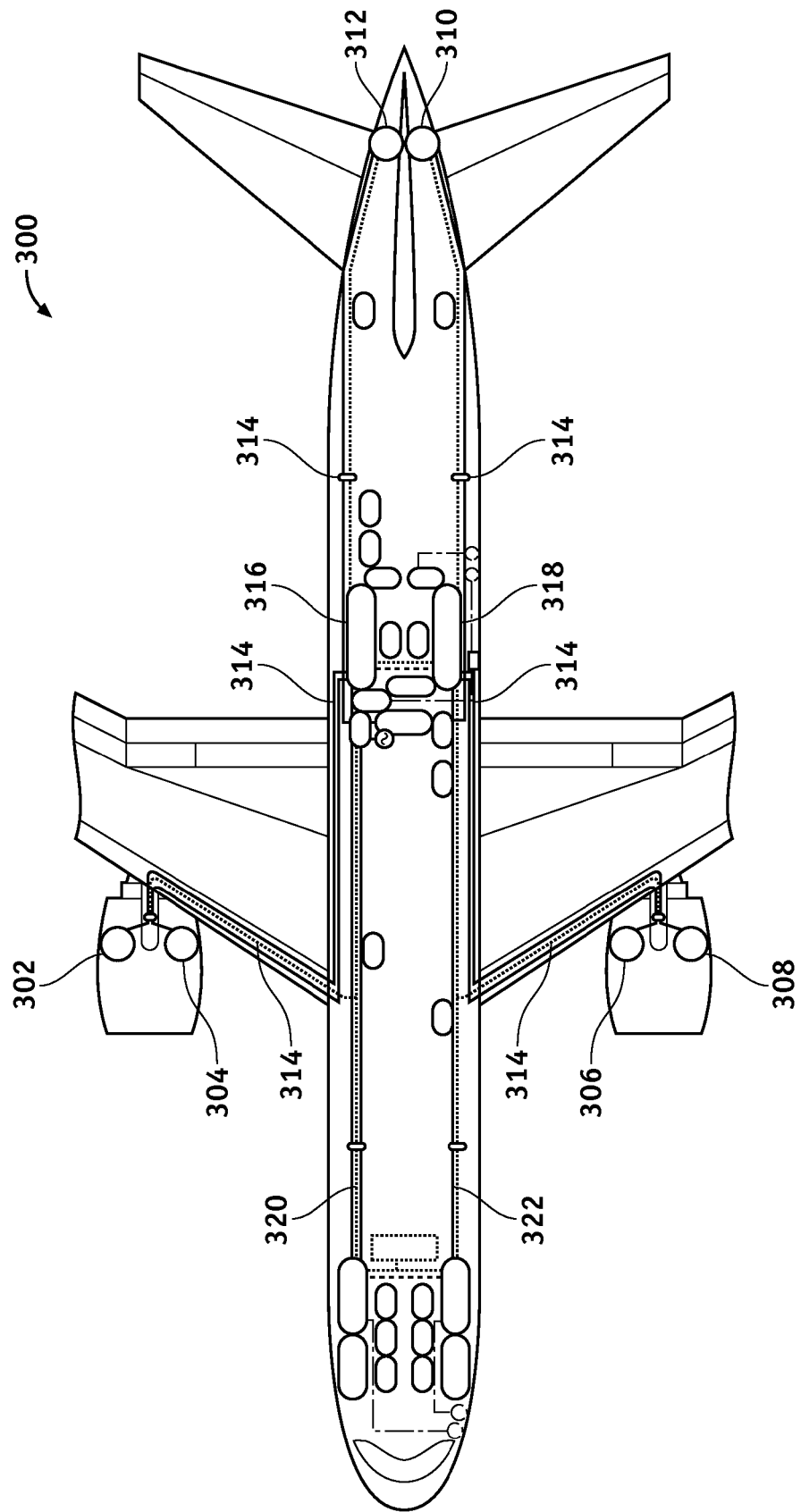
FIG. 3 is an illustration of an aircraft showing exemplary locations of power generators, power distribution lines, and power loads of an electrical system of the aircraft.

FIG. 3 is an illustration of an electrical system 300 of an aircraft showing exemplary locations of power generators, power distribution lines, and power loads. The electrical system 300 may comprise a plurality of power generators such as a first right engine generator 302, a second right engine generator 304, a first left engine generator 306, a second left engine generator 308, a left auxiliary power unit (APU) 310, and a right APU 312.

The electrical system 300 may also comprise a high voltage AC bus 314 (e.g., 230V) coupled to the power generators 302-312. The electrical system 300 may also comprise at least one auto transformer unit (ATU) 316 operable to transform an AC current from the high voltage AC bus 314 to a low voltage AC bus 320 (e.g., 115V). The electrical system 300 may also comprise at least one transformer rectifier unit (TRU) 318 operable to transform an AC current from the high voltage AC bus 314 to a low voltage DC bus 322 (e.g., 28V).

Figure 4:
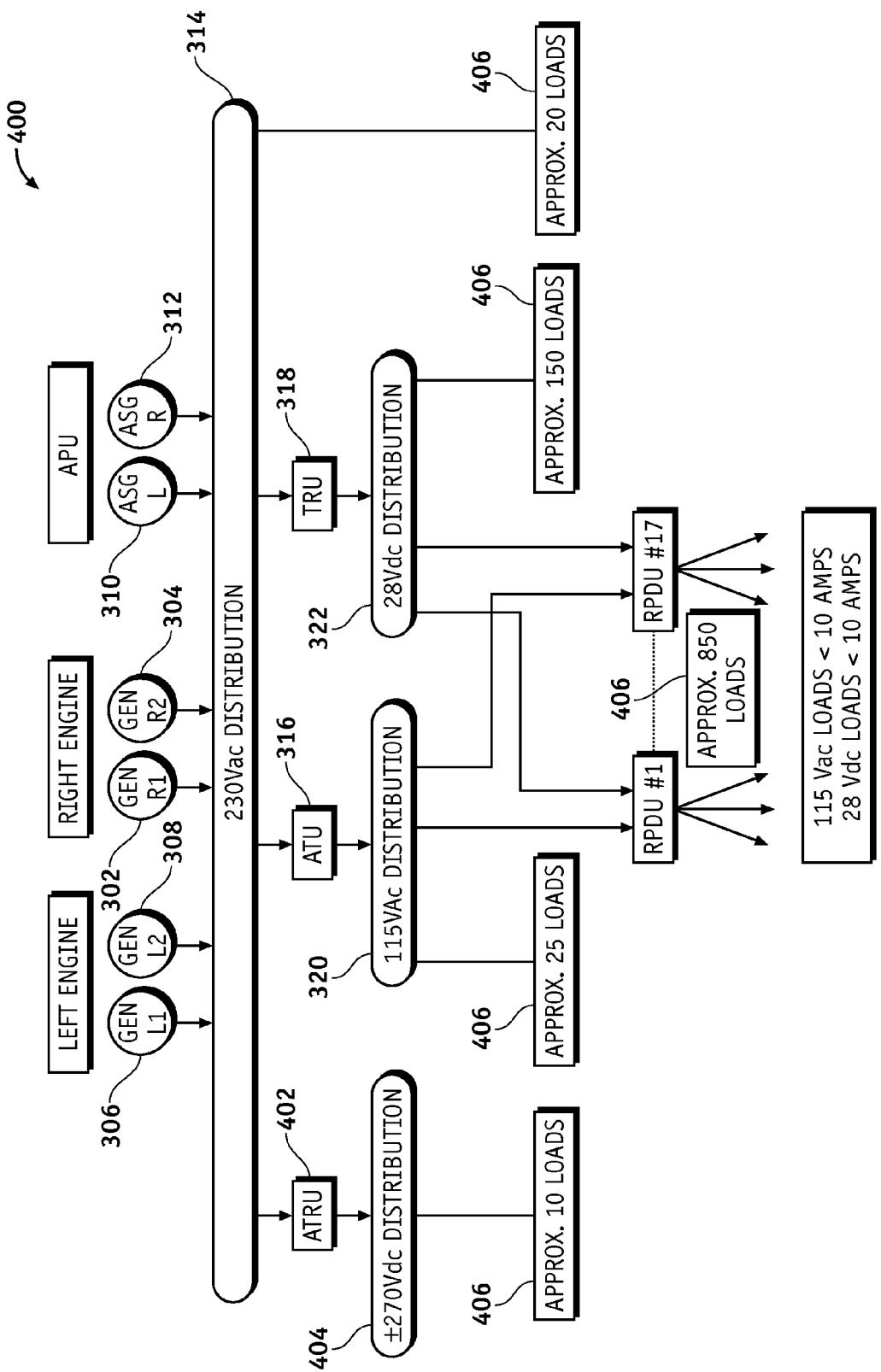
FIG. 4 is an illustration of an exemplary functional diagram of an electrical architecture of the electrical system of FIG. 3 according to an embodiment of the disclosure.

FIG. 4 is an illustration of an exemplary functional diagram of an electrical architecture 400 of the electrical system 300 of FIG. 3 according to an embodiment of the disclosure. The electrical architecture 400 comprises the power generators 302-312, the high voltage AC bus 314, the at least one ATU 316, the at least one TRU 318, the low voltage AC bus 320, and the low voltage DC bus 322. The electrical architecture 400 comprises an auto transformer rectifier unit (ATRU) 402 coupled to a high voltage DC bus 404. The high voltage AC bus 314, the low voltage DC bus 322, and the high voltage DC bus 404 may be coupled to a plurality of loads 406. The high voltage AC bus 314, the low voltage DC bus 322 may also be coupled to one or more Remote Power Distribution Units (RPDUs) (e.g., RPDU#1, . . . RPDU#17) that are in turn coupled to the loads 406. In practical embodiments, various loads and parts may be used.

A part may comprise, for example but without limitation, an electrical component, a fuse, a switch, a power line, an actuator, an effector, a power supply, a replacement part, a Nitrogen Generation System (NGS), and the like.

The loads 406 may be distributed as follows. The high voltage DC bus 404 may be coupled, for example but without limitation, to adjustment speed motors comprising: hydraulic Electric Motor Pump (EMP), NGS, Environmental Control System (ECS) compressors, ECS fans, engine start, and the like.

The low voltage AC bus 320 may be coupled to large loads (e.g., <10 amps) comprising, for example but without limitation, ECS lavatory/galley fans, equipment cooling, fans, window and the like.

Similarly, the low voltage DC bus 322 may be coupled to large loads (e.g., >10 amps) comprising, for example but without limitation, DC fuel pumps, igniters, flight deck displays, Bus Power Control Unit (BPCUs)/Galley Cooling Unit (GCUs), and the like.

The high voltage AC bus 314 may also be coupled to large loads, for example but without limitation, wing ice protection, hydraulic AC, motor pump, fuel pumps, galley ovens, cargo heaters, ECS recreation fans, and the like.

Figure 5:
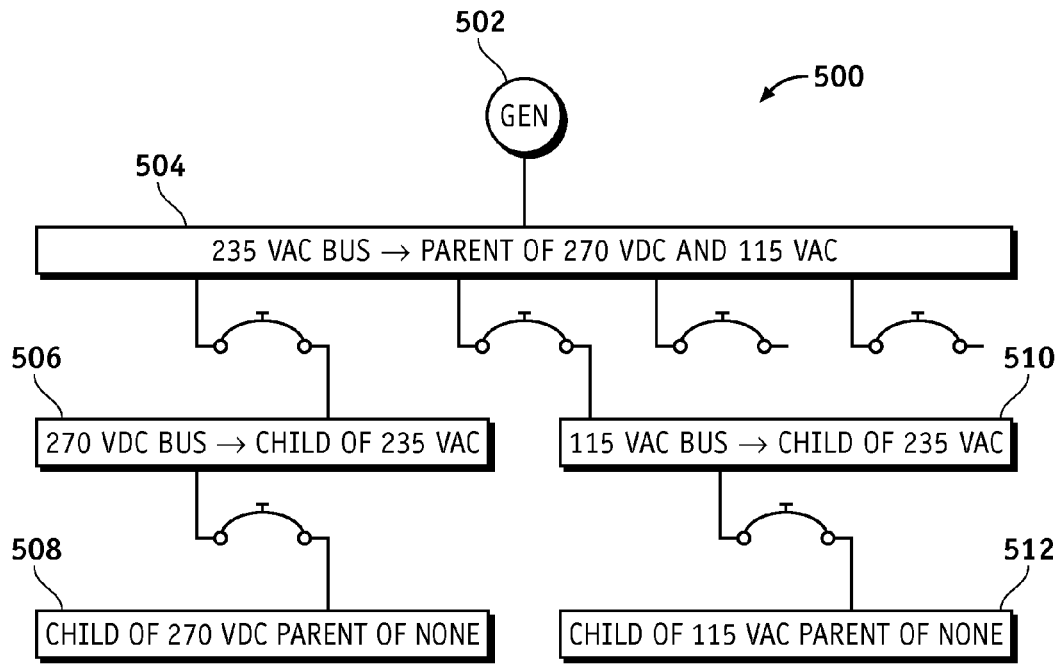
FIG. 5 is an illustration of an exemplary hierarchical extraction of the electrical architecture of FIG. 4 according to an embodiment of the disclosure.

FIG. 5 is an illustration of an exemplary hierarchical breakdown of a hierarchical extraction 500 of the electrical architecture 400 of FIG. 4 according to an embodiment of the disclosure. The hierarchical extraction 500 (hierarchy 500) may comprise a generator node 502 corresponding to the first right engine generator 302, and coupled to a high voltage AC bus node 504. The high voltage AC bus node 504 corresponds to the high voltage AC bus 314, and is designated a parent in the hierarchy 500 of a high voltage DC bus node 506 corresponding to the high voltage DC bus 404.

The high voltage AC bus node 504 is also designated a parent in the hierarchy 500 of a low voltage AC bus node 510 corresponding to the low voltage AC bus 320. The high voltage DC bus node 506 is designated as a child of the high voltage AC bus node 504 in the hierarchy 500. The low voltage AC bus node 510 is designated as a child of the high voltage AC bus node 504 in the hierarchy 500. A motor controller node 508 corresponding to one of the loads 406 (FIG. 4) is designated as a child of the high voltage DC bus node 506 and parent of none. A remote power distribution unit node 512 corresponding to one of the loads 406 is designated as a child of the low voltage AC bus node 510 and parent of none.

Figure 6:
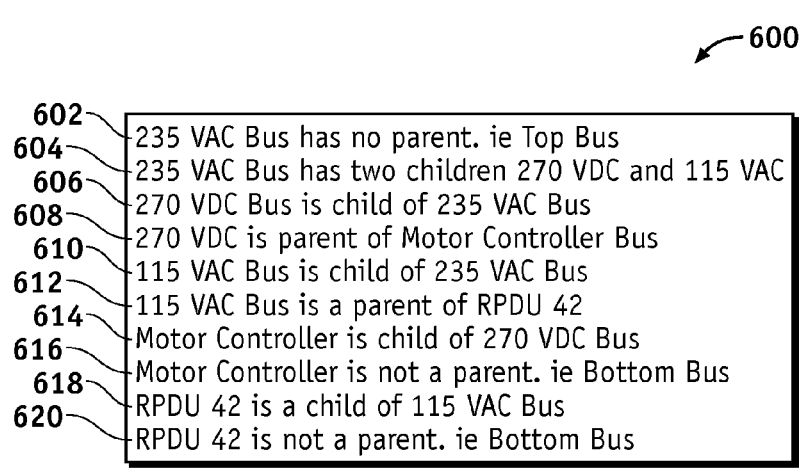
FIG. 6 is an illustration of an exemplary tabular database extraction of hierarchical database extraction of FIG. 5 according to an embodiment of the disclosure.

FIG. 6 is an illustration of an exemplary tabular database extraction 600 of the hierarchical extraction 500 of FIG. 5 according to an embodiment of the disclosure. The tabular database extraction 600 comprises the nodes 502-512 of the hierarchical extraction 500 in a tabular form 602-620.

Figure 7:
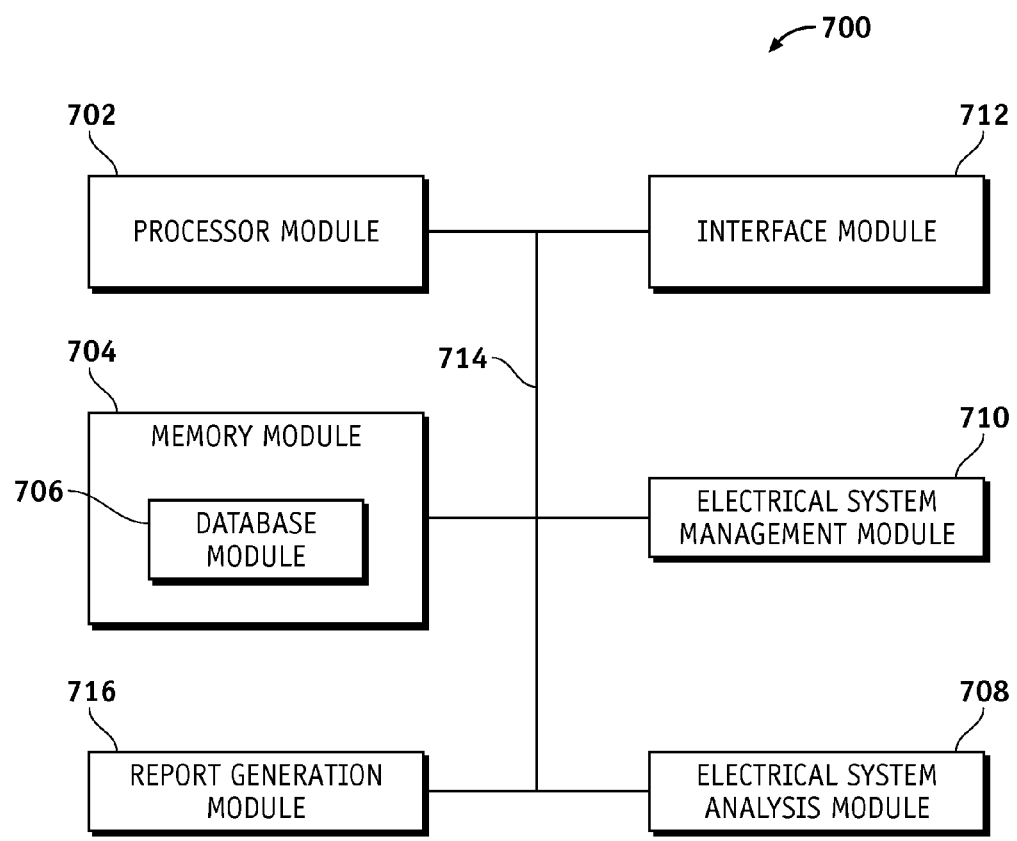
FIG. 7 is an illustration of an exemplary functional block diagram of an electrical load life-cycle management and analysis system according to an embodiment of the disclosure.

FIG. 7 is an illustration of an exemplary functional block diagram of a electrical load life-cycle management and analysis system 700 (system 700) according to an embodiment of the disclosure. The system 700 significantly simplifies electrical load analysis of large scale system such as aircraft system, allowing users/operators to easily and efficiently manage and analyze an electrical loading on a power distribution system from design to retirement of an electrical system and minimizing cost of electrical load analysis while meeting total system safety constraints.

The system 700 may comprise, for example but without limitation, a desktop, a laptop or notebook computer, a handheld computing device (PDA, cell phone, palmtop, etc.), a mainframe, a server, a client, or any other type of special or general purpose computing device as may be desirable or appropriate for a given application or environment. The system 700 generally comprises a physical housing (not shown), a processor module 702, a memory module 704, a database module 706, an electrical system analysis module 708, an electrical system configuration management module 710 (electrical system management module 710), an interface module 712, a report generation module 716, and a network bus 714.

The processor module 702 comprises processing logic that is configured to carry out the functions, techniques, and processing tasks associated with the operation of the system 700. In particular, the processing logic is configured to support the electrical system management of the system 700 described herein. For example, the processor module controls the interface module 712 to present an interface thereon to present tabular and graphical information thereon.

The processor module 702 also accesses electrical system configuration data and electrical system requirements stored in the database module 706 to support functions of the system 700. Further, the processor module 702 controls operations of electrical system management module 710, and the electrical system analysis module 708 to enable management of the electrical system as well as to provide compliance information, whereby the system 700 manages the electrical system lifecycle from design to retirement.

In this manner, the processor module 702 enables users and operators of the eLAT to easily and efficiently manage and analyze an electrical loading on a power distribution system to optimize operation and prevent unexpected overloading of the electrical system.

The electrical system configuration data may comprise, for example but without limitation, part location data, electrical system organization data, electrical system hierarchy data, electrical system connection data, electrical system structure data, circuit diagrams, part maximum load data, part maximum current data part maximum voltage data, part service life data, and part manufacturer data.

The compliance information may comprise, for example but without limitation, data related to and or identifying: a) a part in non-compliance, b) a part drawing an excessive electrical load in an electrical system, c) a non-standard part, d) a non-recommended part, e) a part nearing an end of service life, f) a part exceeding a service life, g) all parts in compliance, and similar types of information.

The processor module 702 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 704 may be a data storage area with memory formatted to support the operation of the system 700. The memory module 704 is configured to store, maintain, and provide data as needed to support the functionality of the system 700 in the manner described below. In practical embodiments, the memory module 704 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 704 may be coupled to the processor module 702 and configured to store, for example but without limitation, the tabular database extraction 600, in an electrical system database, such as the database module 706, and the like. Additionally, the memory module 704 may represent a dynamically updating database containing a table for updating the database module 706, and the like. The memory module 704 may also store, a computer program that is executed by the processor module 702, an operating system, an application program, tentative data used in executing a program, and the like.

The memory module 704 may be coupled to the processor module 702 such that the processor module 702 can read information from and write information to the memory module 704. As an example, the processor module 702 and memory module 704 may reside in respective application specific integrated circuits (ASICs). The memory module 704 may also be integrated into the processor module 702. In an embodiment, the memory module 704 may comprise a cache memory for storing temporary variables or other intermediate information during execution of instructions to be executed by the processor module 702. The memory module comprises the database module 706.

The database module 706 may comprise, for example but without limitation, a hierarchical database, a network database, a relational database, an object oriented database, and the like. The database module 706 is operable to store, for example but without limitation, the electrical system requirements, the electrical system configuration data, algorithms, methodologies, and the like, that may be used in the system 700. The electrical system requirements may comprise authoritative requirements, such as but without limitation, minimum rated electrical capacities, maximum load levels, and the like. The algorithm may comprise for example but without limitation, an electrical system model and modeling, a load analysis, and the like. The methodologies may comprise for example but without limitation, part replacement information, wiring diagrams, and the like.

The configuration of the electrical system may be extracted into a data model in which the data is organized into a tree-like structure (500 in FIG. 5). The structure allows repeating information using parent/child relationships where each parent can have many children but each child only has one parent in a one to many ratio. Attributes of a specific record may be listed under an entity type in a tabular manner, where each individual record is represented as a row and an attribute as a column. The system 700, at the time of an event, such as but without limitation, a sale, lease or transfer of an aircraft, and the like, transfers database module 706 comprising electrical load configuration data for one or more aircraft to a new operator identification.

The transferred electrical load configuration data may be referred to as a baseline, initial and/or delivery configuration, a delivery load analysis document or other similarly identified initial data configuration. In one embodiment, the baseline electrical load configuration data may be tagged or labeled as "Delivery" to indicate that it is the delivery configuration that will be the baseline for future changes to the electrical loading for that identified aircraft. In one embodiment, the Delivery tagged data cannot be changed by future database users. In another embodiment, the Delivery tagged data can only be changed by future database users having appropriate permissions to alter, edit or otherwise change the Delivery tagged data.

The electrical system analysis module 708 is operable to determine electrical system performance characteristics as a function of and based on the electrical system configuration data. The electrical system performance characteristic may comprise, for example but without limitation, electrical system management data that may comprise, among other types of management information, a load on an AC bus, a load distribution analysis, a flight phase load analysis, a non-optimal condition load analysis, and a "what-if" load analysis. The "what-if" load analysis may also further comprise, for example but without limitation, simulating electrical system configuration changes, simulating part changes, simulating usage scenario changes, and the like.

The electrical system management module 710 is operable to manage at least one change to the electrical system configuration data, and compare the electrical system performance characteristics to the electrical system requirements to enable optimal electrical system management, and to enable optimal performance and to provide compliance information. In this manner an operator can input the at least one change using the interface module 712 as explained in more detail below. The electrical system management module 710 further provides compliance information, and generates a report based on the compliance information. The report may comprise, for example but without limitation an authoritative change, a service bulletin, a customer change, a third party change, an electrical load analysis, a compliance report, and the like, as explained in more detail below.

The interface module 712 is operable to communicate with an operator of an electrical system configured according to the electrical system configuration data. The interface module 712 may also be further operable to provide an internet webpage interface. The interface module 712 may comprise, for example but without limitation, a service bulletin, a compliance report, a circuit diagram, tabular information, graphical information, location information of a part, an electrical load analysis tool (eLAT) interface, a project management interface, a bus management worksheet interface, a load data input interface, a project report, a project report interface, an internet webpage interface, a local area network webpage interface, and the like, as explained in more detail below. The interface module 712 is further operable to communicate with the operator to report at least one authoritative change to the operator, and/or to receive at least one authoritative change from the operator.

The report generation module 716 is operable to provide user readable status of the electrical load analysis for a target airplane. The report generation module 716 generates, for example but without limitation, a paper report, a web delivered report, a screen display, an electronic data delivery report, and the like, as explained in more detail below.

Figure 8:
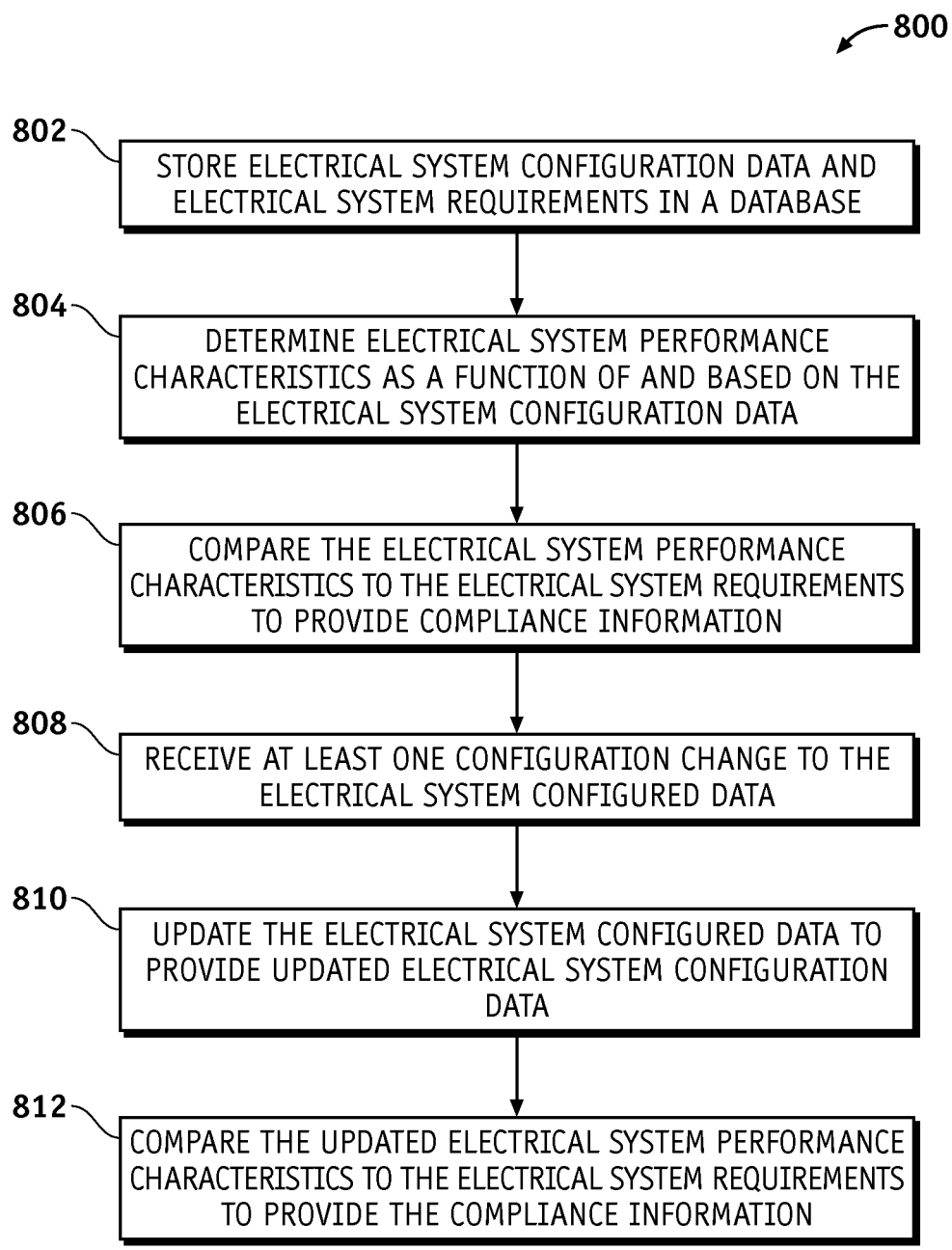
FIG. 8 is an illustration of an exemplary flowchart showing a electrical load life-cycle management and analysis process according to an embodiment of the disclosure.

FIG. 8 is an illustration of an exemplary flowchart showing an electrical load life-cycle management and analysis process 800 according to an embodiment of the disclosure. The various tasks performed in connection with process 800 may be performed mechanically, by software, hardware, firmware, a computer-readable medium having computer executable instructions for performing the process method, or any combination thereof. It should be appreciated that process 800 may include any number of additional or alternative tasks, the tasks shown in FIG. 8 need not be performed in the illustrated order, and process 800 may be incorporated into a more comprehensive procedure or process having additional functionality not described in detail herein.

For illustrative purposes, the following description of process 800 may refer to elements mentioned above in connection with FIGS. 1-7. In practical embodiments, portions of the process 800 may be performed by different elements of the system 700 such as: the processor module 702, the memory module 704, the database module 706, the electrical system analysis module 708, the electrical system management module 710, the interface module 712, and the network bus 714. Process 800 may have functions, material, and structures that are similar to the embodiments shown in FIGS. 1-7. Therefore common features, functions, and elements may not be redundantly described here.

Process 800 may begin by storing electrical system configuration data and electrical system requirements in a database (task 802).

The process 800 may continue by the electrical system analysis module 708 determining electrical system performance characteristics as a function of and based on the electrical system configuration data (task 804).

The process 800 may continue by the electrical system analysis module 708 comparing the electrical system performance characteristics to the electrical system requirements to provide compliance information (task 806).

The process 800 may continue by the interface module 712 receiving at least one configuration change to the electrical system configured data (task 808).

The process 800 may continue by the electrical system management module 710 updating the electrical system configuration data to provide updated electrical system configuration data (task 810).

The process 800 may continue by the electrical system analysis module 708 comparing the updated electrical system performance characteristics to the electrical system requirements to identify optimal and non-optimal performance of the electrical system, and to provide the compliance information (task 812).

Figure 9:
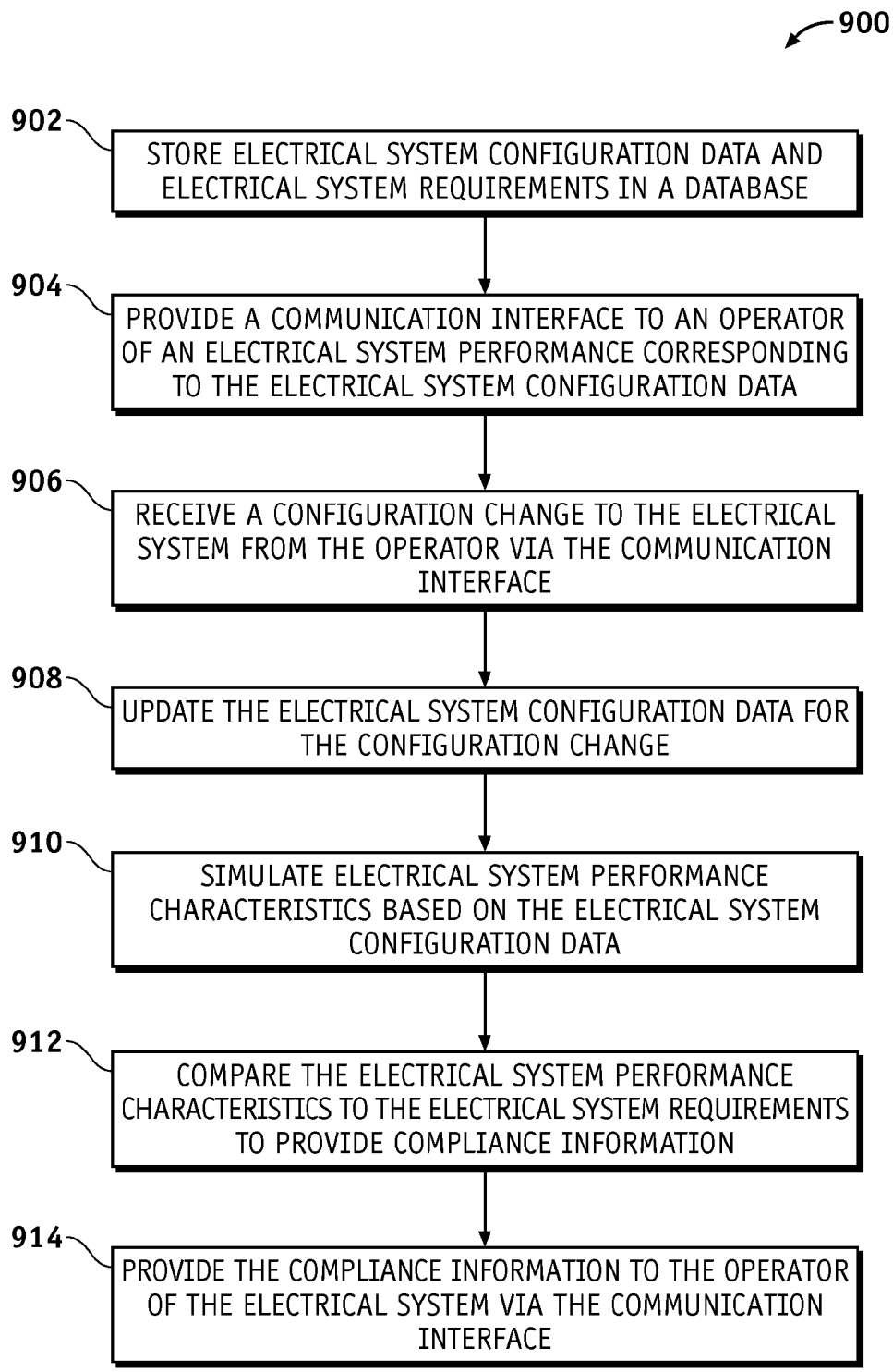
FIG. 9 is an illustration of an exemplary flowchart showing a process for operating an electrical load life-cycle management and analysis system according to an embodiment of the disclosure.

FIG. 9 is an illustration of an exemplary flowchart showing a process 900 for operating an electrical load life-cycle management and analysis system according to an embodiment of the disclosure. The various tasks performed in connection with process 900 may be performed mechanically, by software, hardware, firmware, a computer-readable medium having computer executable instructions for performing the process method, or any combination thereof. It should be appreciated that process 900 may include any number of additional or alternative tasks, the tasks shown in FIG. 9 need not be performed in the illustrated order, and process 900 may be incorporated into a more comprehensive procedure or process having additional functionality not described in detail herein.

For illustrative purposes, the following description of process 900 may refer to elements mentioned above in connection with FIGS. 1-7. In practical embodiments, portions of the process 900 may be performed by different elements of the system 700 such as: the processor module 702, the memory module 704, the database module 706, the electrical system analysis module 708, the electrical system management module 710, the interface module 712, and the network bus 714. Process 900 may have functions, material, and structures that are similar to the embodiments shown in FIGS. 1-7. Therefore common features, functions, and elements may not be redundantly described here.

Process 900 may begin by the memory module 704 storing electrical system configuration data and electrical system requirements in the database module 706 (task 902).

Process 900 may continue by the interface module 712 providing a communication interface to an operator of an electrical system corresponding to the electrical system configuration data (task 904).

Process 900 may continue by the interface module 712 receiving a configuration change to the electrical system from the operator via the communication interface (task 906).

Process 900 may continue by the electrical system management module 710 updating the electrical system configuration data for the configuration change (task 908).

Process 900 may continue by the electrical system analysis module 708 simulating electrical system performance characteristics as a function of and based on the electrical system configuration data (task 910).

Process 900 may continue by the electrical system analysis module 708 comparing the electrical system performance characteristics to the electrical system requirements to provide compliance information (task 912).

Process 900 may continue by the interface module 712 providing the compliance information to the operator of the electrical system via the communication interface (task 914).

Based on the compliance information and/or a load analysis, the operator may replace a part with a replacement part. For example, the compliance information may indicate the part is subject to an excessive load for its rated capability, and the replacement part may be operable to operate with a higher electrical load. In order to aid in replacing the part, the interface module 712 and/or external software using part identification from the interface module 712 may display graphical information about the part. The graphical information may comprise, for example but without limitation, location information for the part (e.g., FIG. 3), a circuit diagram for the part, and the like.

In this way, an electrical system lifecycle from design to retirement is comprehensively managed to enable optimal performance of the electrical system. The electrical system lifecycle may comprise, for example but without limitation, production, post production, an as-operating or as-driving baseline configuration for a vehicle, an as-flying configuration for an aircraft, an as-sailing configuration for a boat or a ship, an as-operating configuration for: a building, a city, a town, and a factory, and the like. FIGS. 10-23 are illustrations of the communication interfaces (interface pages) that can be used by an operator to analyze electrical loads of the electrical system via the system 700 during the electrical system lifecycle. The interface pages can be accessed by an operator, for example but without limitation, via an internet webpage interface, a local area network webpage interface, a local computer interface page, and the like.

In this manner, manufacturers as well as a new owner of the vehicle or structure having a complex electrical system can easily and efficiently manage the electrical load on the electrical system and, for example but without limitation, determine "what if" sceneries, add/delete electrical components to ensure adequate load is provided for certain operation thereby enabling optimal operation and avoiding non-optimal operation, and the like. Additionally, regulatory agencies, such as but without limitations, Federal Aviation Administration (FAA), automotive regulatory agencies, building and factory regulatory agencies, and the like, can easily and efficiently obtain and use results of the eLAT analysis for purpose of certification, and the like.

In the embodiments shown in FIGS. 10-23 an aircraft electrical system is used as an example of the electrical system, however, as mentioned above, embodiments of the disclosure are not limited to such aircraft electrical system, and the eLAT and the interface pages thereof can also be used for analyzing loads on other electrical systems, such as but without limitation, ship electrical systems, building electrical systems, factory electrical systems, town and city electrical systems, and the like.

Figure 10:
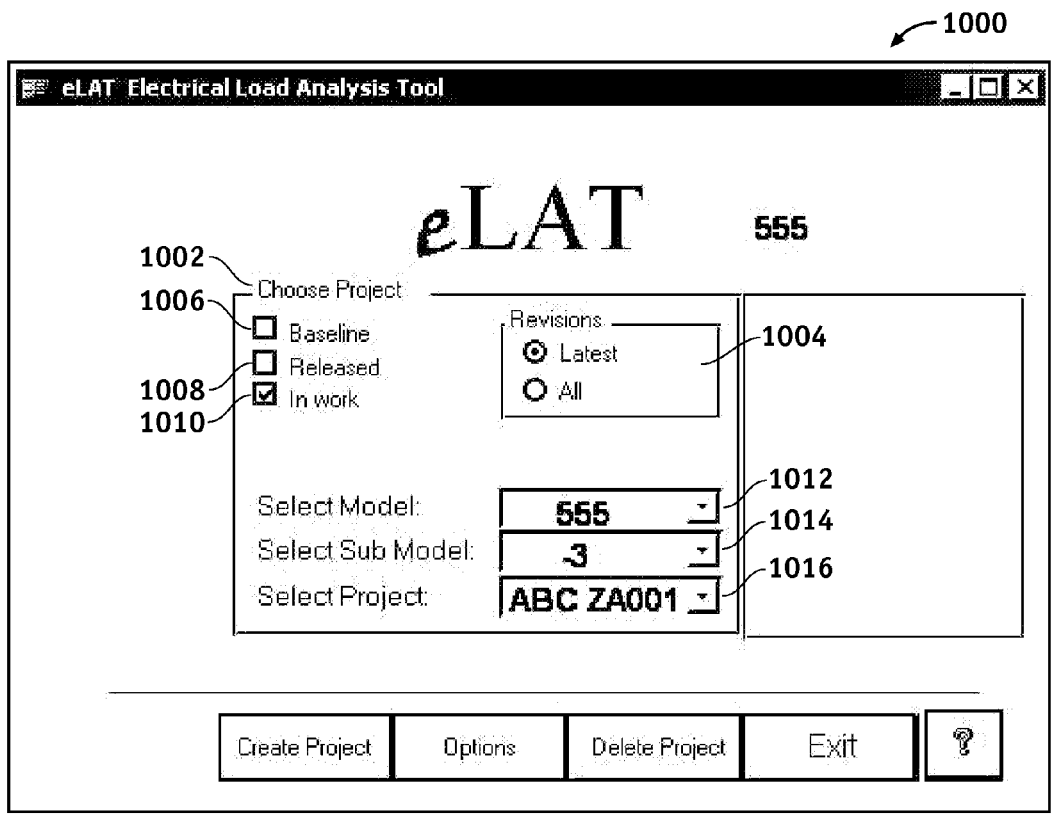
FIG. 10 is an illustration of an exemplary electrical load analysis tool (eLAT) project identification interface page according to an embodiment of the disclosure.

FIG. 10 is an illustration of an exemplary electrical load analysis tool (eLAT) interface page 1000 (interface page 1000) according to an embodiment of the disclosure. The interface page 1000 provides project identification. An operator can choose an aircraft by an aircraft identification in order to update, modify and/or calculate an electrical load analysis (ELA). For example, the operator chooses a project type in a choose project field 1002. The project type may comprise, a baseline configuration 1006, a released configuration 1008, or an in work configuration 1010. The aircraft identification may comprise, for example but without limitation, a model number, a project identifier, tail number, and the like.

To select the aircraft identification, the user may select a model number "555" in a select model filed 1012, select a sub model number "–3" in a select sub model field 1014, and/or enter a project identification number "ABC ZA001" in a select project field 1016. The operator may also choose at least one revision (e.g., latest, all) of the project type by selecting the desired revision in a revisions filed 1004. Upon choosing the project, the model number "555" and/or the project identification number "ABC ZA001", the operator can navigate various functions related the selected revision of the project as explained below.

Figure 11:
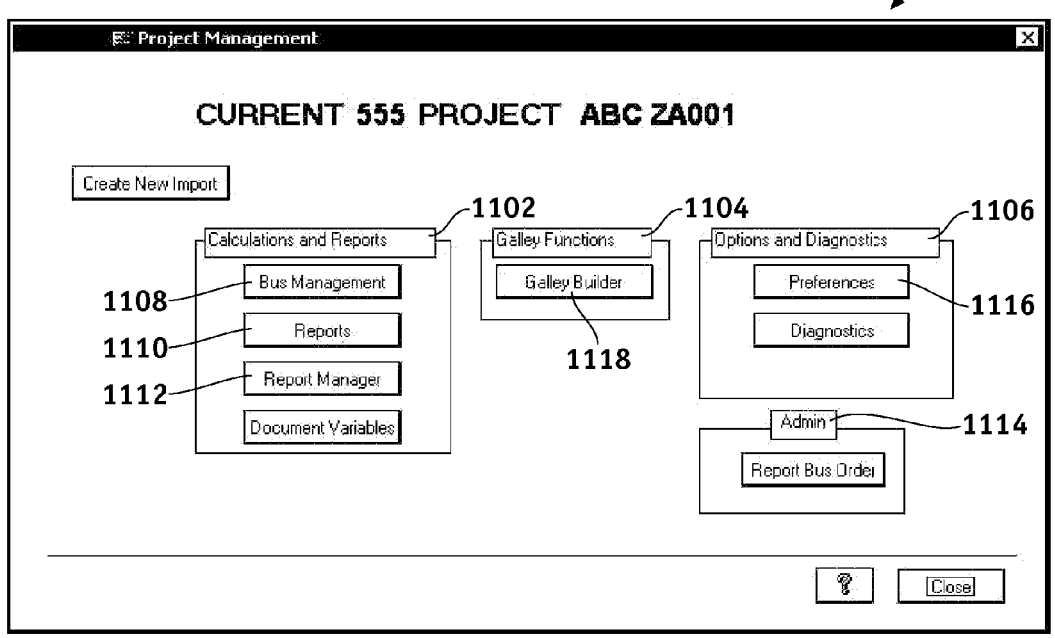
FIG. 11 is an illustration of an exemplary project management project function navigation interface page according to an embodiment of the disclosure.

FIG. 11 is an illustration of an exemplary project management interface page 1100 (interface page 1100) according to an embodiment of the disclosure. The interface page 1100 provides project function navigation. The interface page 1100 may comprise, for example but without limitation, a calculation and reports area 1102, a galley functions area 1104, an options and diagnostic area 1106 and an administration area 1114. The administration area 1114 may require elevated permission for access. The operator may perform any number of load changes or modifications associated with the model number 555 and the project identification number ABC ZA001 selected in the interface page 1000 discussed in FIG. 10 above. For example but without limitation, the operator can activate/press a bus management button 1108 to: add/delete a bus, add/delete a circuit breaker (CB), perform "What If" scenarios, select a CB and enter a new or changed load data value(s), and the like, as explained in more detail in the context of discussion of FIG. 12 below. The operator may also generate various reports, as explained in more detail below, by activating/pressing reports button 1110. Additionally, the operator can also activate the report manager button 1112 to select various report options as discussed in more detail in the context of discussion of FIG. 16 below.

The galley functions area 1104 comprises a galley builder button 1118. The operator can press/activate the galley builder button 1118 to access a galley builder user interface that allow him/her to configure galley components (e.g., coffee pots, ovens, etc.) and electrical loads thereof.

The administration area 1114 is an area requiring elevated permission for access that controls aspects of the project. For example but without limitation, the administration area 1114 controls who accesses some or all of the project, and the like.

Figure 12:
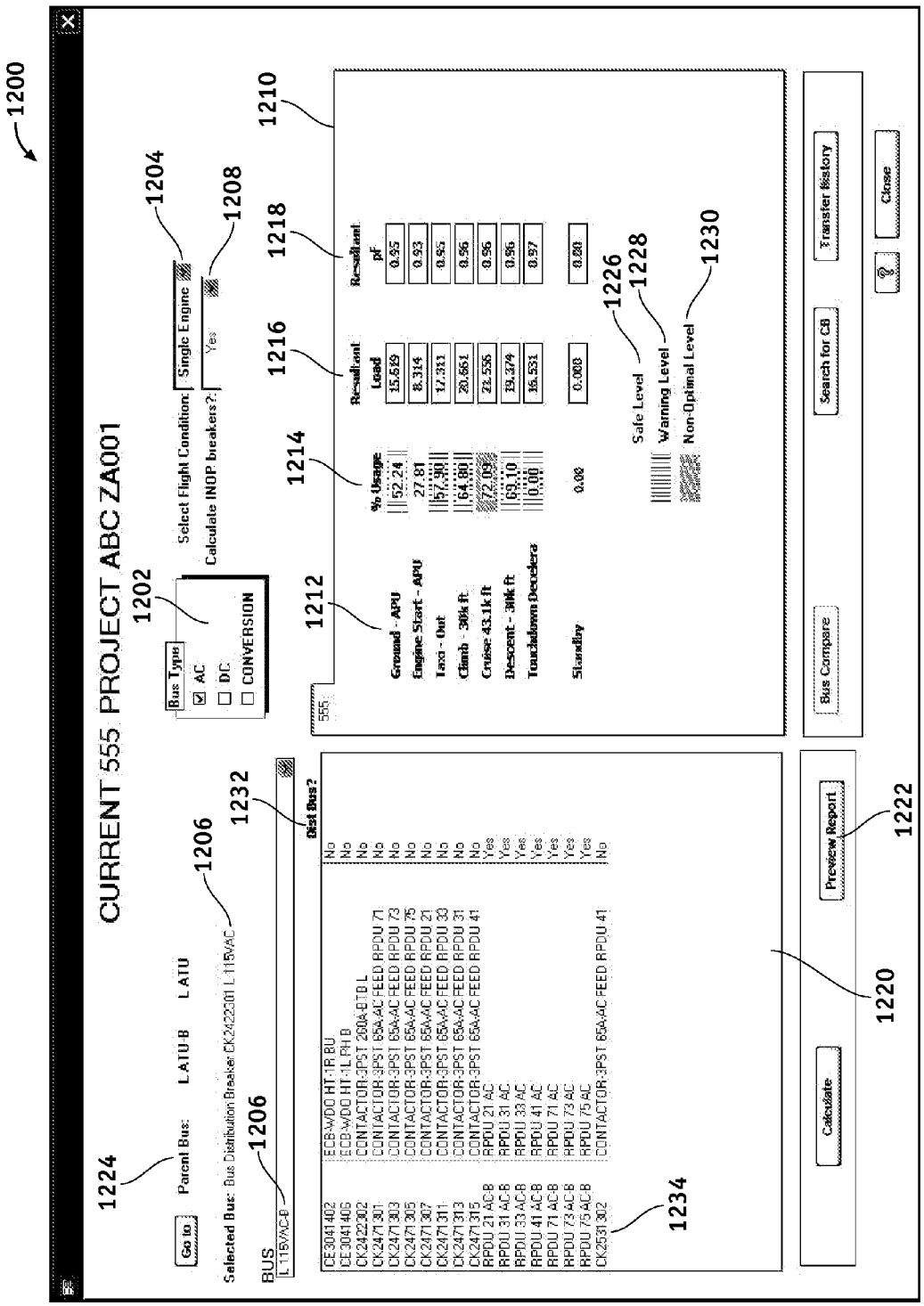
FIG. 12 is an illustration of an exemplary electrical system and bus management project bus navigation and usage profile interface page according to an embodiment of the disclosure.

FIG. 12 is an illustration of an exemplary electrical system and bus management interface page 1200 (interface page 1200) that can be activated by pressing the bus management button 1108 of the interface page 1100 (FIG. 11) according to an embodiment of the disclosure. The interface page 1200 provides project bus navigation and usage profile. The operator may choose a bus type in a bus type field 1202, a flight condition in a flight condition field 1204, a parent bus 1206, whether to calculate inoperative (INOP) breakers in Calculate INOP breakers field 1208, and the like. Alternatively, the operator may navigate down the bus hierarchy shown in FIG. 5 by selecting a child bus (506-512 in FIG. 5) such as items of a child list 1220 indicated to be a bus by selecting a Distribution ("Dist.") Bus 1232 identifier equal to "Yes". The operator may also navigate up the bus hierarchy shown in FIG. 5 by selecting the parent bus 1206 (504 in FIG. 5) by activating a parent bus link 1224. By pressing/activating a preview report button 1222, a bus specific report may then be generated for the parent bus 1206 comprising the child CBs 1220 and resultant values. A bus specific display 1210 may then be generated showing the resultant values for the parent bus 1206 comprising the child CBs 1220. The bus specific display 1210 comprises, for example but without limitation, percentage ("%") usage 1214, resultant load 1216, resultant power factor (PF) 1218, and the like, for various flight conditions 1212, indicating safe level 1226, warning level 1228, and non-optimal level 1230 of electrical loadings. In this manner, the operator can determine whether to rearrange circuits and parts and components to increase or decrease load capacity of a specific bus such as the parent bus 1206 for a given flight condition 1212.

Figure 13:
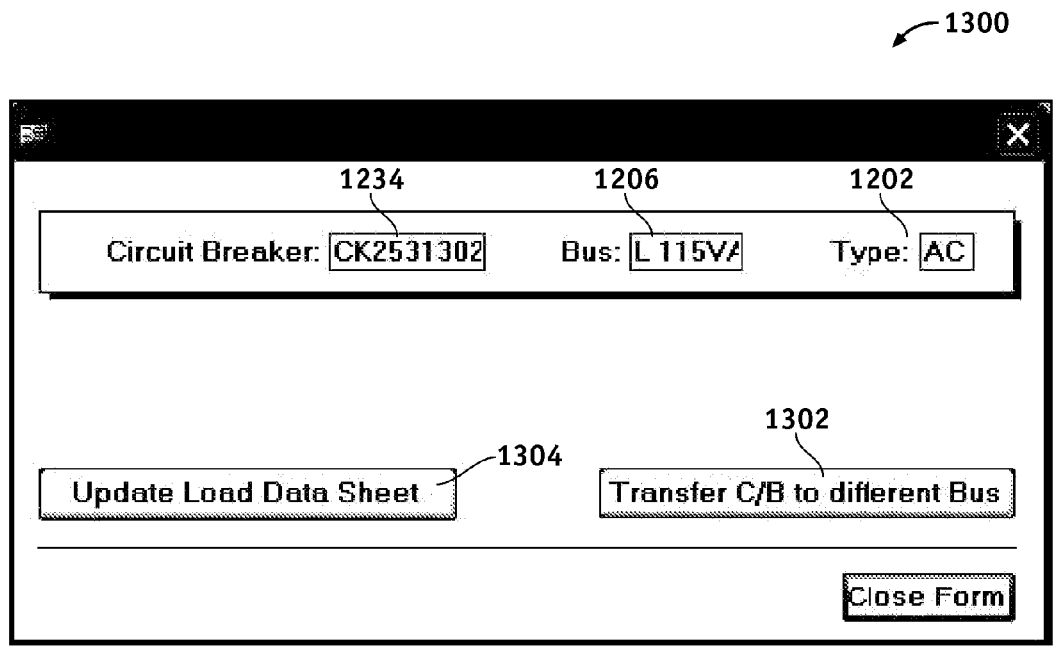
FIG. 13 is an illustration of an exemplary electrical system and bus management interface page according to an embodiment of the disclosure.

FIG. 13 is an illustration of an exemplary electrical system and bus management interface page 1300 (interface page 1300) according to an embodiment of the disclosure. The interface page 1300 allows the operator to update and transfer CB related information to another bus. For example, the operator can update and transfer at least one of the child CBs 1220 such as the CB 1234 (CK2531302) related to the parent bus 1206, having the bus type selected in the bus type field 1202 in the interface page 1200 above, to a different bus by activating a "transfer CB to different bus button" 1302. The operator can select the CB 1234 by activating/pressing/double-clicking the corresponding Dist Bus 1232 identifier on the interface page 1200.

In response to activating/pressing the "transfer a CB to a different bus button" 1302 an interface page opens to provide access to "What If" scenarios creation as shown below in the context of discussion of FIG. 14. The operator can also select to update load data sheet as shown below in the context of discussion of FIG. 15 by activating/pressing an update load data sheet button 1304.

Figure 14:
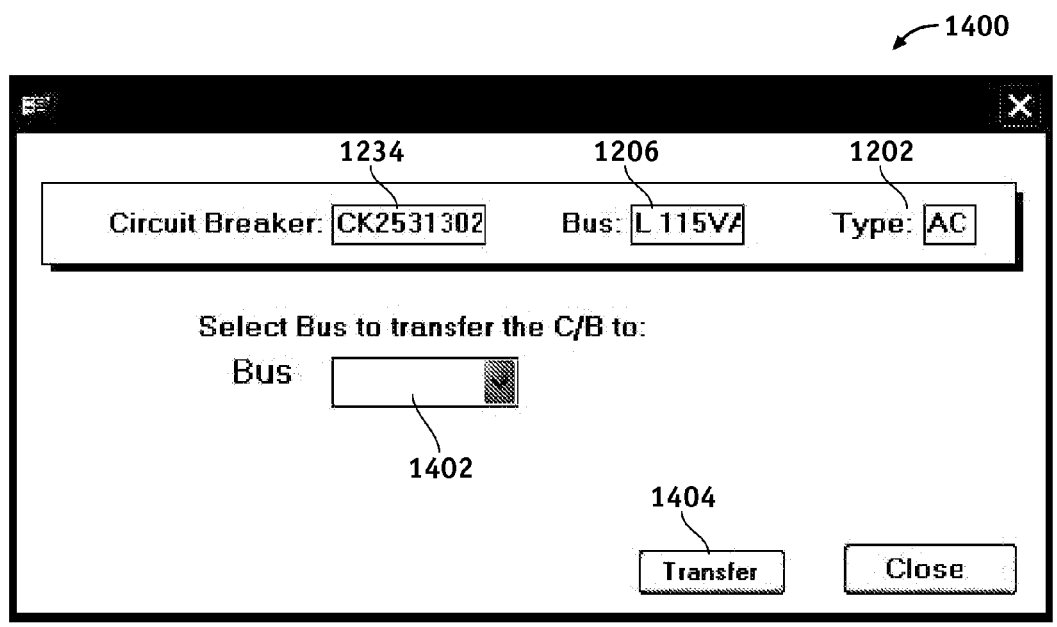
FIG. 14 is an illustration of an exemplary electrical system and bus management interface page that enables "What If" requirements to be given according to an embodiment of the disclosure.

FIG. 14 is an illustration of an exemplary electrical system and bus management interface page 1400 (interface page 1400) that enables "What If" requirements to be given according to an embodiment of the disclosure. The interface page 1400 provides access to the "What If" scenarios creation. The operator may activate/press a transfer button 1404 to transfer a selected CB load 1234 (FIG. 12) of the parent bus 1206 having the bus type 1202 to another selected bus 1402 of the same type in a "What If" scenario.

Figure 15:
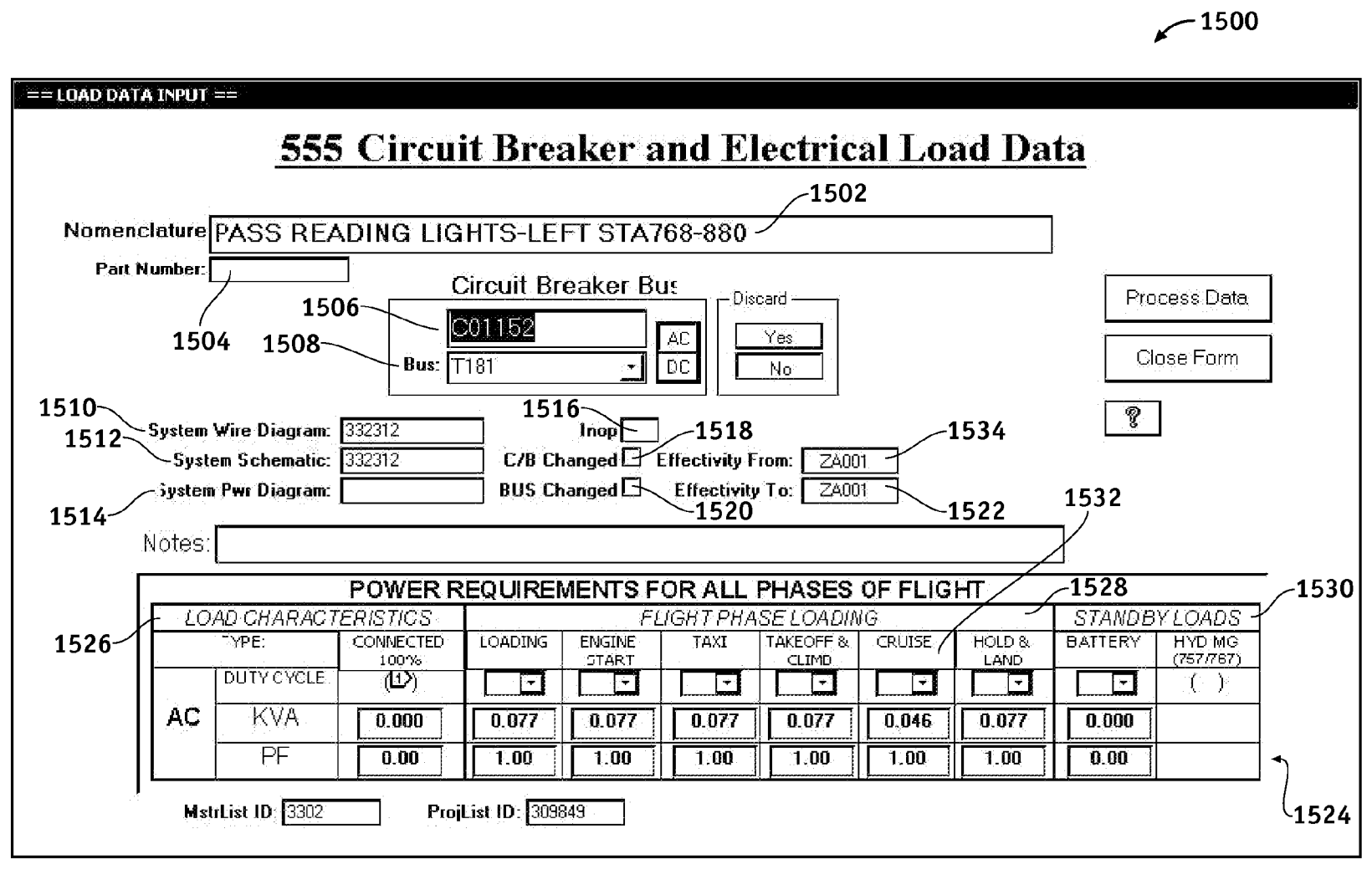

FIG. 15 is an illustration of an exemplary load data input interface page 1500 (interface page 1500) according to an embodiment of the disclosure. The interface page 1500 provides power requirements for a given CB and enables "What If" requirements to be given. For example, the operator can input a nomenclature in a nomenclature input field 1502, a part number in a part number field 1504, a CB identifier in a CB information field 1506, a bus identifier in a bus information field 1508. Additionally, the operator can provide a system wire diagram number in a system wire diagram field 1510, a system schematic number in a system schematic field 1512, and/or a system power diagram number in a system power diagram field filed 1514. The operator can also select an Inop field 1516 (i.e., indicating an inoperative part), whether the C/B is changed 1518, and/or the bus is changed 1520.

The operator may provide power requirements table 1524 related to the CB information for various aircraft operation phases. The table 1524 comprises, a load characteristics column 1526, flight phase loading column 1528, and standby loads column 1530. For example, the flight phase loading 1528 for cruise phase 1532 indicates load characteristics 1526 is an AC type CB with an electrical loading of 0.046 Kilovolt-amperes (KVA), and a power factor (PF) of 1.00 (i.e., a PF of 1.00 indicates a very efficient electrical loading, as PF decreases toward 0 power efficiency decreases accordingly). In this manner, the operator can provide an updated load capacity of the cruise phase 1532.

The operator may specify an aircraft that the electrical load data changes are applicable to in an "Effectivity From" field 1534 and an "Effectivity To" field 1522. For example, many aircraft identifiers such as tail numbers may be sequential (e.g., ZA001, ZA002, ZA010). Thus a range of aircraft may be specified by a starting number such as ZA002 in the "Effectivity From" field 1534, and an ending number such as ZA009 in the "Effectivity To" field 1522. A single aircraft may be specified by a single number such as ZA001 in both the "Effectivity From" field 1534 and the "Effectivity To" field 1522.

Figure 16:
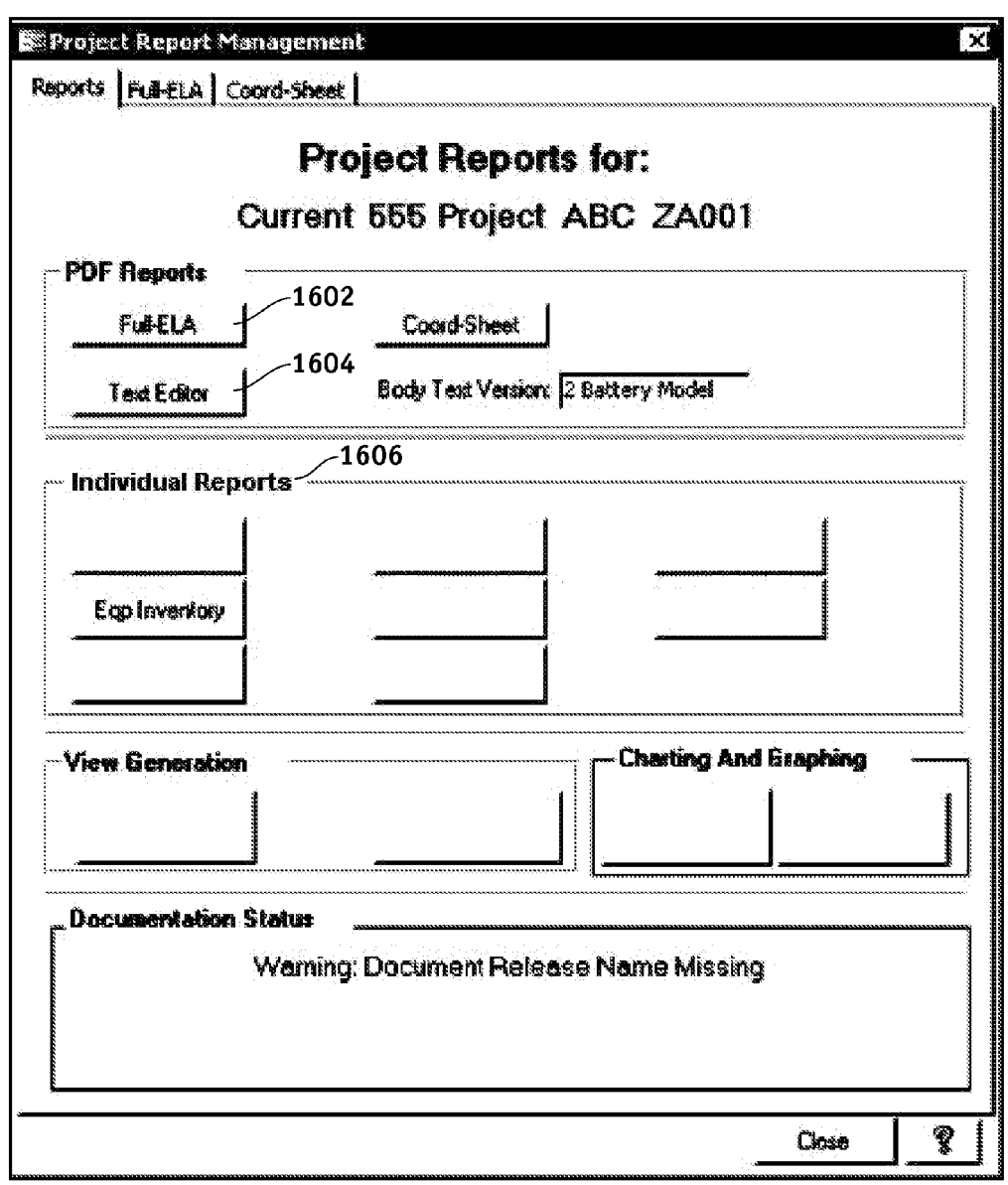
FIG. 16 is an illustration of an exemplary project report navigation interface page according to an embodiment of the disclosure.

FIG. 16 is an illustration of an exemplary project report interface page 1600 (interface page 1600) according to an embodiment of the disclosure. The interface page 1600 provides various load reports in various formats. For example, an operator can generate a full electrical load analysis (Full-ELA) report in portable document format (pdf) format by activating/pressing a Full-ELA button 1602. An operator may generate individual report sections 1606, spread sheet formats, text formats, and the like. A text editor can be used by pressing/activating a text edit button 1604. Alternatively, reports can also be generated graphically by using, for example and without limitation, bar charts, Visio™ format, and the like.

Figure 17:
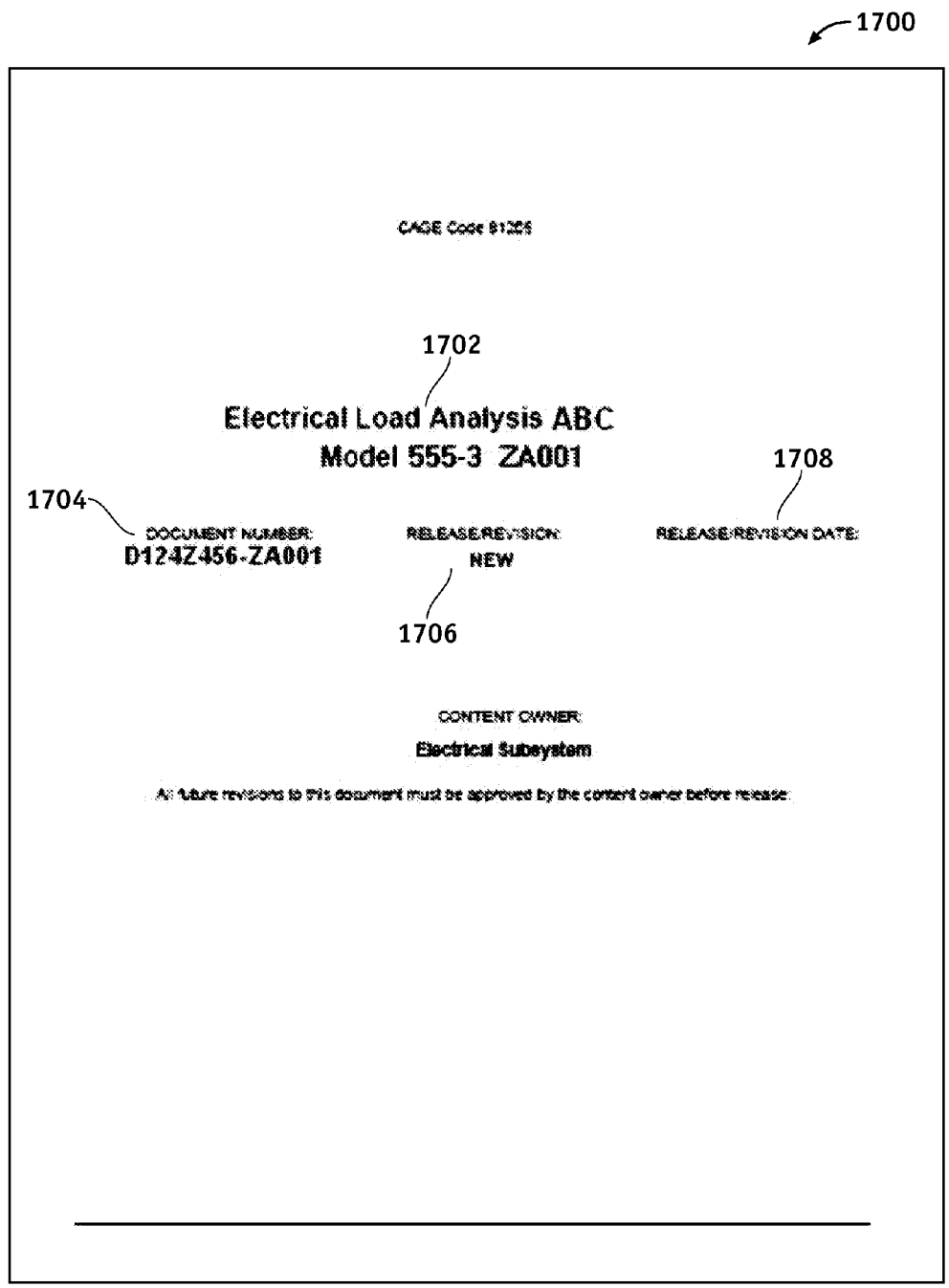
FIG. 17 is an illustration of an exemplary electrical load analysis according to an embodiment of the disclosure.

FIG. 17 is an illustration of an exemplary electrical load analysis report 1700 according to an embodiment of the disclosure. The electrical load analysis report 1700 comprises an example of a cover page of the Full-ELA report that can be obtained by activation/pressing the 1602 button on the interface page 1600. The electrical load analysis report 1700 comprises a title 1702, a document control number 1704, a release version 1706, and a release revision date 1708. The electrical load analysis report comprises report sections, charts, graphs, text and the like, required for demonstration of electrical system loading requirements, configuration and compliance.

Figure 18:
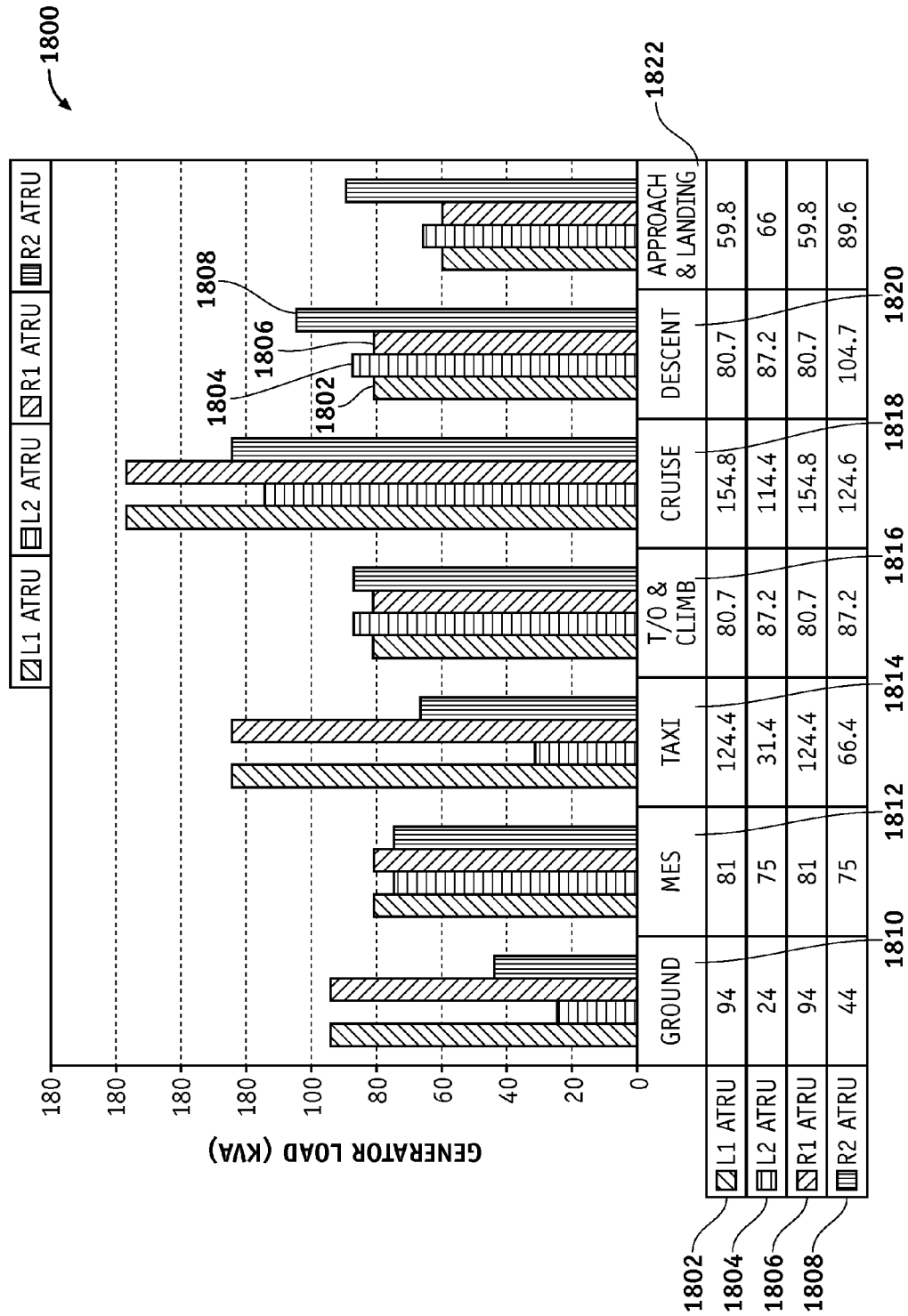
FIG. 18 is an illustration of an exemplary output page showing an ATRU operation histogram according to an embodiment of the disclosure.

FIG. 18 is an illustration of an exemplary output page showing an ATRU operating histogram report 1800 (histogram report 1800) according to an embodiment of the disclosure. The histogram report 1800 shows generator load in KVA by four auto transformer rectifier units L1 ATRU 1802, L2 ATRU 1804, R1 ATRU 1806, and R2 ATRU 1808 respectively, for various aircraft operation such as ground 1810, Main Engine Start (MES) 1812, taxi 1814, takeoff and climb 1816, cruise 1818, descent 1820, and approach and landing 1822. For example, for descent 1820, the L1 ATRU 1802, L2 ATRU 1804, R1 ATRU 1806, and R2 ATRU 1808, can provide 80.7 KVA, 87.2 KVA, 80.7, and 104.7 KVA respectively. Therefore, the operator can decide whether to increase or decrease the generator load for the decent 1820, for example.

Figure 19:
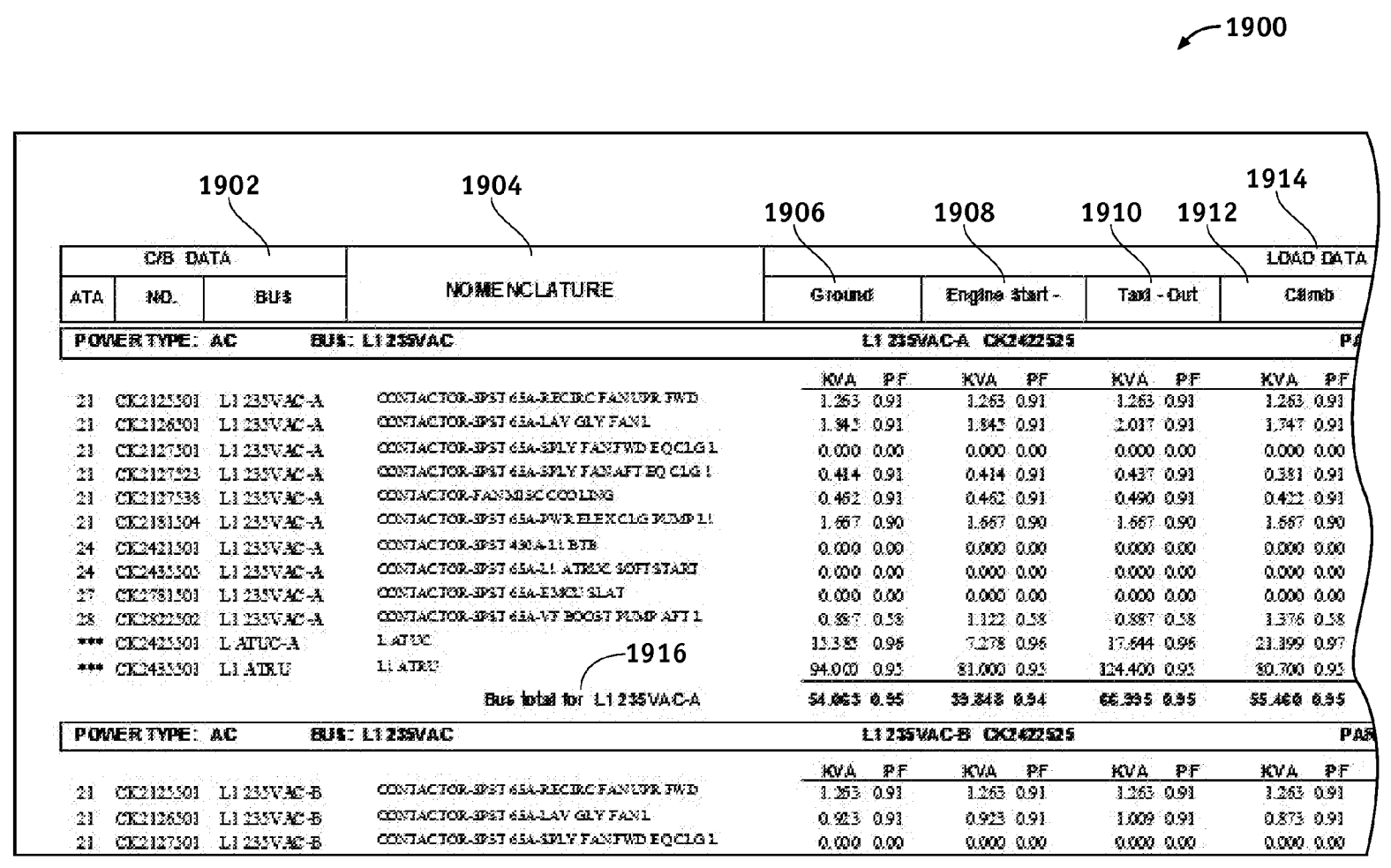

FIG. 19 is an illustration of an exemplary report page 1900 according to an embodiment of the disclosure. The report page 1900 can be generated by activating the reports button 1110 of the interface page 1100 as explained above. In the embodiment shown in FIG. 19, the report page 1900 comprises C/B data 1902, nomenclature 1904, load data 1914 comprising power factor (PF) and load (KVA) for: ground 1906, engine start 1908, taxi-out 1910, and climb 1912 aircraft operations. A total load 1916 for the specified bus (e.g., L1235VAC-A) is also shown on the report 1900. In this manner, the operator can determine whether the load on the specified bus is excessive, not enough, or adequate for a given aircraft operation 1906-1912.

Figure 20:
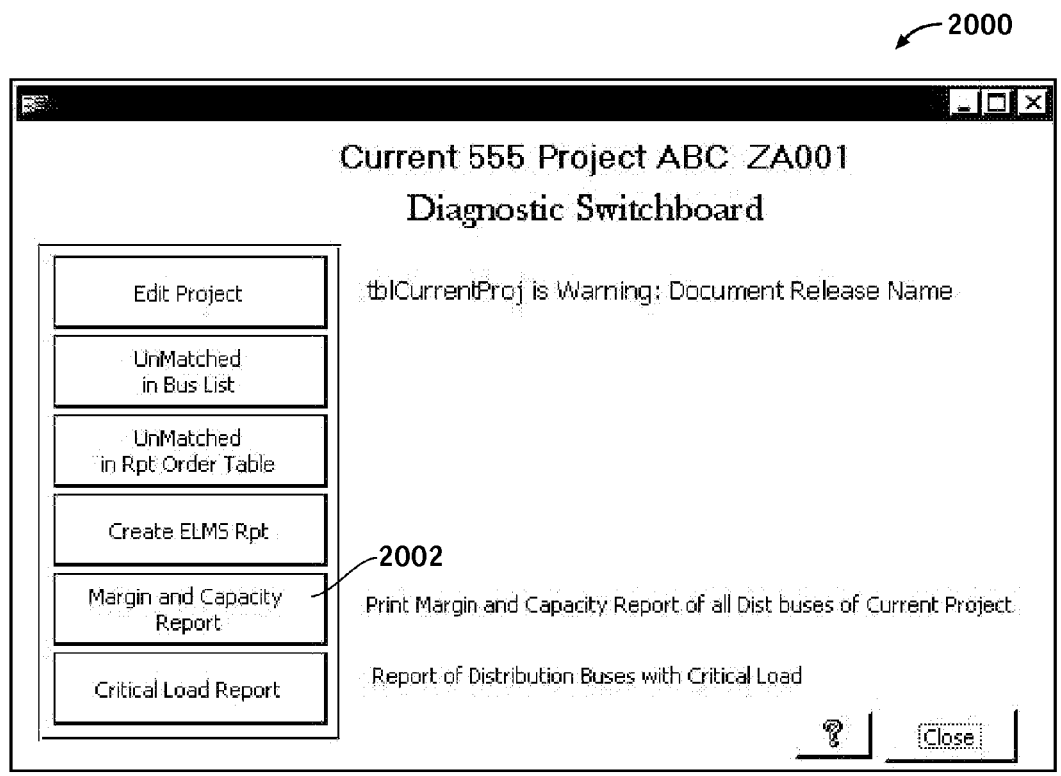
FIG. 20 is an illustration of an exemplary project diagnostic interface page for electrical load management diagnostics according to an embodiment of the disclosure.

FIG. 20 is an illustration of an exemplary project diagnostic interface page 2000 (interface page 2000) according to an embodiment of the disclosure. The operator can perform diagnostic functions on the aircraft electrical data comprising but not limited to a margin and capacity report. The operator can activate the margin and capacity report as shown below by activating/pressing the margin and capacity button 2002.

FIG. 21 is an illustration of an exemplary margin and capacity report 2100 according to an embodiment of the disclosure. In the embodiment shown in FIG. 21, the margin and capacity report 2100 comprises a type column 2102, a bus column 2104, a bus name column 2106, a plurality of normal load data columns 2108, a C/B identification (ID) column 2110, a C/B capacity column 2112, an Amps column 2114, a margin column 2116, a % of capacity column 2118, and a load level column 2120.

For example, a row 2122 of the margin and capacity report 2100 indicates that a bus GENL2-A (column 2104) with a type AC (column 2102) and a C/B ID M2421002 (column 2110) has a non-optimal load level (column 2120) as specified by load capacity parameters 2124 and a load threshold level interface page 2200 discussed below in the context of FIG. 22. The row 2122 also indicates, the C/B capacity of 354.61 amps (column 2112), margin of 67.438 amps (column 2116), and % capacity of 80.98 (column 2118). The operator can determine appropriate action for operating the bus GENL2-A in various aircraft operation.

Figure 22:
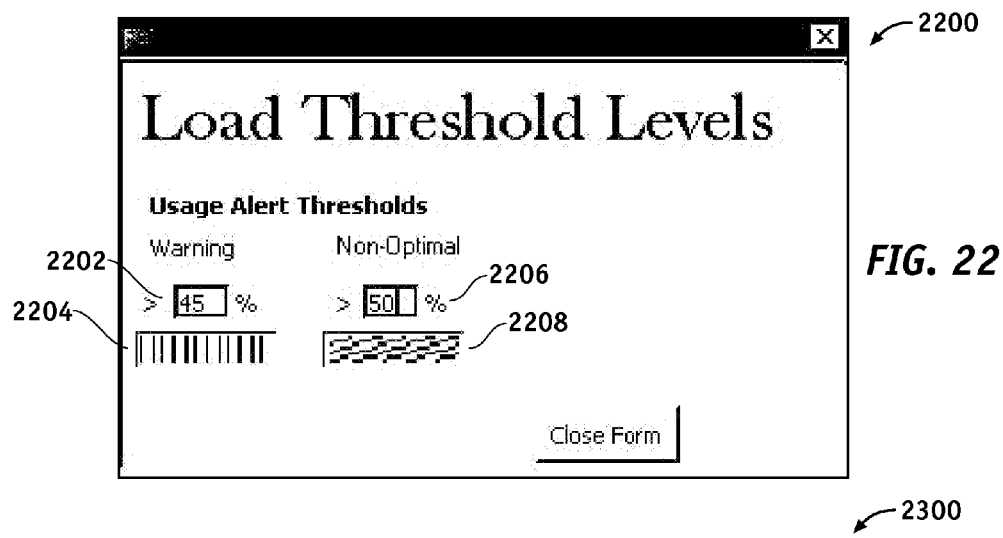
FIG. 22 is an illustration of an exemplary load threshold level interface page according to an embodiment of the disclosure.

FIG. 22 is an illustration of an exemplary load threshold level interface page 2200 (interface page 2200) according to an embodiment of the disclosure. The interface page 2200 comprises an adjustable warning indicator threshold 2202, a warning indicator 2204, an adjustable non-optimal indicator threshold 2206, and a non-optimal indicator 2208. The interface page 2200 may be used in conjunction with various interface pages to set alert indicators on load analysis results.

For another example, the load capacity parameters 2124 of the margin and capacity report 2100 of FIG. 21 is indicated to be "safe", "warning", and "Non-optimal" in the load level column 2120 according to the adjustable warning indicator threshold 2202 and the adjustable non-optimal indicator threshold 2206. For yet another example, the % usage 1214 of the bus management interface page 1200 of FIG. 12 is indicated to be "warning level" 1228, and "Non-optimal level" 1230 in the % usage 1214 column by highlighting according to the adjustable warning indicator threshold 2202 and the adjustable non-optimal indicator threshold 2206. The interface page 2200 may be accessed by activation of the preferences button 1116 of the project management interface page 1100 of FIG. 11.

The adjustable warning indicator threshold 2202 may comprise, for example but without limitation, a percentage of a maximum value, an absolute threshold level of a parameter of interest, and the like.

The warning indicator 2204 may comprise, for example but without limitation, a color, a hatching pattern, a pattern, a color and hatching pattern, a blinking illumination, an illumination effect, and the like.

The adjustable non-optimal indicator threshold 2206 may comprise, for example but without limitation, a percentage of a maximum value, an absolute threshold level of a parameter of interest, and the like.

The non-optimal indicator 2208 may comprise, for example but without limitation, a color, a hatching pattern, a pattern, a color and hatching pattern, a blinking illumination, an illumination effect, and the like.

Figure 23:
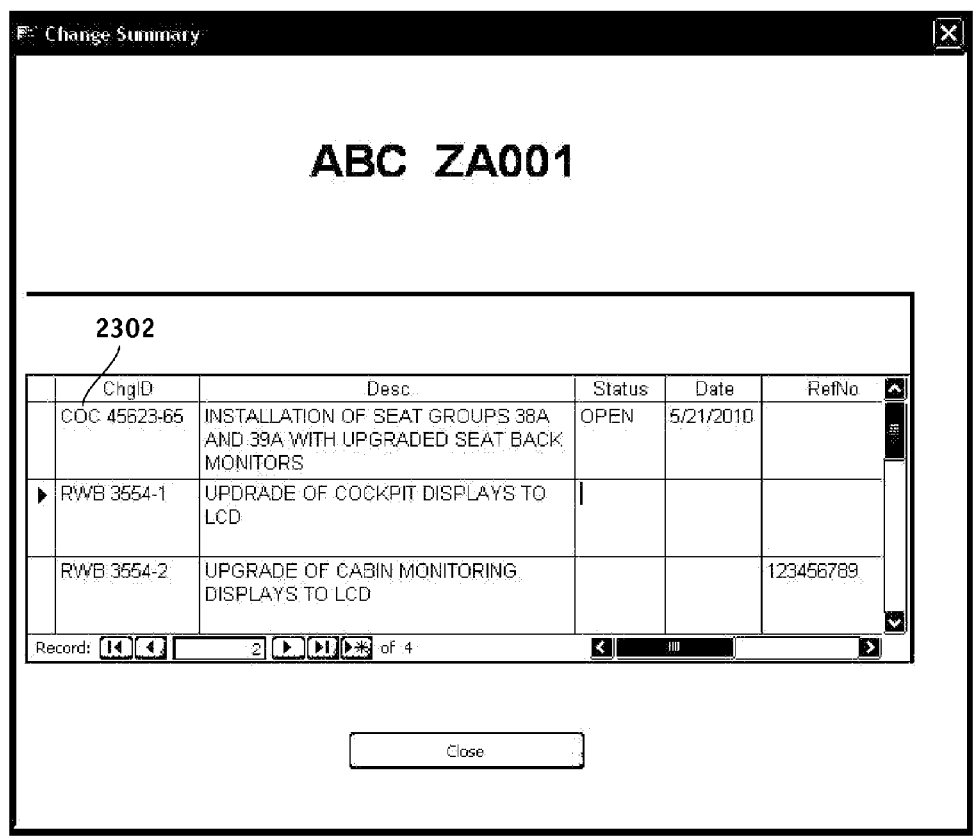
FIG. 23 is an illustration of an exemplary change interface page according to an embodiment of the disclosure.

FIG. 23 is an illustration of an exemplary change interface page 2300 (interface page 2300) according to an embodiment of the disclosure. The operator can use the interface page 2300 to determine authoritative changes to the electrical system. For example, at a post delivery phase, the operator can determine the authoritative changes, such as but without limitation, customer originated changes (COC), a service bulletin (SB) change, a supplemental type certificate (STC) change, a customer change, a third party change, and the like. For example, as shown in the interface page 2300, the COC 2302 indicates status of "installation of seat group 38A and 39A with upgrades seat back monitors" for the aircraft ABC ZA001 is open as of date May 21, 2010.

In this way, embodiments of the disclosure provide a system and method to allow users/operators to easily and efficiently manage and analyze an electrical loading on a power distribution system from design to retirement of an electrical system, whereby minimizing cost of electrical load analysis while meeting total system safety constraints.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the processor module 702 to cause the processor module 702 to perform specified operations. Such instructions, generally referred to as "computer program code" or "program code" (which may be grouped in the form of computer programs or other groupings), when executed, enable electrical load analysis of the system 700.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-3 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. An aircraft electrical load life-cycle management and analysis system comprising:
   a database module operable to store electrical system configuration data and electrical system requirements of an aircraft;
   an electrical system analysis module operable to determine electrical system performance characteristics as a function of the electrical system configuration data, the electrical system configuration data comprising electrical system organization data, electrical system hierarchy data, electrical system connection data, circuit data, and electrical system structure data, and the electrical system performance characteristics comprising a load distribution analysis and a flight phase load analysis; and
   an electrical system configuration management module operable to:
      manage at least one change to the electrical system configuration data, the at least one change comprising one of adding and deleting an electrical component; and
      compare the electrical system performance characteristics to the electrical system requirements to enable optimal performance.

2. The electrical load life-cycle management and analysis system according to claim 1, wherein the electrical system configuration data comprises algorithms and methodologies.

3. The electrical load life-cycle management and analysis system according to claim 1, wherein the electrical system configuration management module is further operable to provide compliance information.

4. The electrical load life-cycle management and analysis system according to claim 3, wherein the electrical system configuration management module is further operable to generate a report based on the compliance information.

5. The electrical load life-cycle management and analysis system according to claim 4, wherein the report comprises one of: an authoritative change and an electrical load analysis report.

6. The electrical load life-cycle management and analysis system according to claim 5, wherein the authoritative change comprises a change selected from one of the group consisting of: a service bulletin, a customer change, and a third party change.

7. The electrical load life-cycle management and analysis system according to claim 1, wherein the electrical system requirements comprise a requirement based on an authoritative change.

8. The electrical load life-cycle management and analysis system according to claim 1, further comprising an interface module operable to communicate with an operator of an electrical system configured according to the electrical system configuration data.

9. The electrical load life-cycle management and analysis system according to claim 8, wherein the interface module is further operable to report at least one authoritative change to the operator.

10. The electrical load life-cycle management and analysis system according to claim 8, wherein the interface module is further operable to receive at least one authoritative change from the operator.

11. The electrical load life-cycle management and analysis system according to claim 8, wherein the interface module is further operable to provide an internet webpage interface.

12. A method for aircraft electrical load life-cycle management and analysis, the method comprising:
   storing electrical system configuration data and electrical system requirements of an aircraft in a database, the electrical system configuration data comprising electrical system organization data, electrical system hierarchy data, electrical system connection data, circuit data, and electrical system structure data;
   configuring load by one of adding and deleting electrical components from the electrical system configuration data;
   determining electrical system performance characteristics based on the electrical system configuration data, and the electrical system performance characteristics comprising a load distribution analysis and a flight phase load analysis; and
   comparing the electrical system performance characteristics to the electrical system requirements to provide compliance information.

13. The method according to claim 12, wherein the electrical system configuration data comprises algorithms and methodologies.

14. The method according to claim 12, further comprising:
   receiving at least one configuration change to the electrical system configured data;
   updating the electrical system configuration data to provide updated electrical system configuration data;
   determining updated electrical system performance characteristics based on the updated electrical system configuration data; and
   comparing the updated electrical system performance characteristics to the electrical system requirements to provide the compliance information.

15. The method according to claim 12, further comprising generating a report based on the compliance information.

16. The method according to claim 15, wherein the report comprises one of: an authoritative change and a compliance report.

17. The method according to claim 12, wherein the electrical system requirements comprise a requirement based on an authoritative change.

18. The method according to claim 12, further comprising communicating with an operator of an electrical system configured according to the electrical system configuration data.

19. The method according to claim 18, further comprising communicating an authoritative change with the operator.

20. The method according to claim 12, further comprising managing a load on an electrical system during one of manufacturing and maintenance of the electrical system based on the electrical system performance characteristics.

21. The aircraft electrical load life-cycle management and analysis system according to claim 1, further comprising a computer program product comprising:
- a computational logic for calculating an electrical load analysis for the aircraft, the computational logic embedded on a non-transitory computer readable medium and executable by a microprocessor for accessing and modifying an electrical load analysis database comprising the electrical system configuration data by a client, wherein the microprocessor generates an electrical load analysis report, and wherein the computational logic:
- accesses the electrical load analysis database,
- receives a load modification comprising addition or deletion of the electrical component from the electrical load analysis database, the load modification associated with a change authorization, and
- computes the electrical load analysis comprising the electrical system performance characteristics.

* * * * *